United States Patent
Rule et al.

(10) Patent No.: US 11,222,342 B2
(45) Date of Patent: Jan. 11, 2022

(54) ACCURATE IMAGES IN GRAPHICAL USER INTERFACES TO ENABLE DATA TRANSFER

(71) Applicant: Capital One Services, LLC, McLean, VA (US)

(72) Inventors: Jeffrey Rule, Chevy Chase, MD (US); Colin Hart, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/863,401

(22) Filed: Apr. 30, 2020

(65) Prior Publication Data

US 2021/0342840 A1 Nov. 4, 2021

(51) Int. Cl.
*G06Q 20/40* (2012.01)
*H04B 5/00* (2006.01)
(Continued)

(52) U.S. Cl.
CPC ......... *G06Q 20/409* (2013.01); *G06F 3/0481* (2013.01); *G06K 7/10297* (2013.01);
(Continued)

(58) Field of Classification Search
USPC ......................................................... 705/44
See application file for complete search history.

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| CA | 3010336 A1 | 7/2017 |
| CN | 101192295 A | 6/2008 |

(Continued)

OTHER PUBLICATIONS

Dirk Husemann. "Standards in the smart card world". Computer Networks 36 (2001) 473-487. (Year: 2001).*

(Continued)

*Primary Examiner* — Ayal I. Sharon
(74) *Attorney, Agent, or Firm* — Kacvinsky Daisak Bluni PLLC

(57) ABSTRACT

Systems, methods, and computer-readable media for providing accurate images of cards. An application executing on a mobile device may receive authentication credentials for an account, determine a card associated with the account, and determine a card manufacturer identifier (CMID) of the card. The application may receive, from a digital asset management system based on the CMID, a plurality of metadata attributes of the card and one or more images of the card. The application may determine, based on the metadata attributes and attributes of the mobile device, a first orientation of the card to enable near-field communication (NFC) data transfer between the card and the mobile device. The application may select a first image of the card. The application may generate a graphical user interface (GUI) including the first image and an indication specifying to tap the card to the mobile device according to the first orientation.

20 Claims, 14 Drawing Sheets

(51) Int. Cl.
  *G06F 3/0481*  (2013.01)
  *G06Q 20/34*  (2012.01)
  *G06K 7/10*  (2006.01)
  *G06Q 40/02*  (2012.01)
  *G06Q 20/32*  (2012.01)
  *H04W 12/06*  (2021.01)

(52) U.S. Cl.
  CPC ....... *G06Q 20/326* (2020.05); *G06Q 20/3278* (2013.01); *G06Q 20/352* (2013.01); *G06Q 20/4018* (2013.01); *G06Q 40/02* (2013.01); *H04B 5/0031* (2013.01); *H04W 12/06* (2013.01)

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 * | 6/2012 | von Behren ....... G06Q 20/3563 717/168 |
| 8,215,563 B2 | 7/2012 | Levy et al. |
| 8,224,753 B2 | 7/2012 | Atef et al. |

(56) References Cited

U.S. PATENT DOCUMENTS

| | | | |
|---|---|---|---|
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,504,470 B1 * | 8/2013 | Chirehdast ............. G06Q 40/02 705/38 |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,660,943 B1 * | 2/2014 | Chirehdast ............. G06Q 40/00 705/38 |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B1 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,005,368 B2 * | 6/2018 | Caldwell ................. B60L 53/35 |
| 10,043,164 B2 | 8/2018 | Dogin et al. |
| 10,075,437 B1 | 9/2018 | Costigan et al. |
| 10,095,888 B1 * | 10/2018 | Lee ........................ G06F 21/64 |
| 10,108,827 B1 * | 10/2018 | Wurmfeld .......... G06K 7/10297 |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,242,283 B1 * | 3/2019 | Jain ....................... G06Q 50/265 |
| 10,467,445 B1 * | 11/2019 | Rule ................... G06K 7/10366 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0049910 A1 * | 4/2002 | Salomon ................. G06F 21/72 713/193 |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |

(56) References Cited

U.S. PATENT DOCUMENTS

| | | |
|---|---|---|
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0238610 A1* | 10/2008 | Rosenberg ......... G06Q 30/0281 340/5.7 |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2009/0309733 A1* | 12/2009 | Moran ................ G06K 19/041 340/572.1 |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1* | 11/2012 | Mullen ................ G06Q 10/00 705/39 |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0141567 A1* | 6/2013 | Walker ................ H04M 1/7253 348/135 |
| 2013/0144793 A1 | 6/2013 | Royston |
| 2013/0171929 A1 | 7/2013 | Adams et al. |
| 2013/0173357 A1* | 7/2013 | Lishak ................ G06Q 20/00 705/13 |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 7/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0233924 A1* | 9/2013 | Burns ................ G06K 19/005 235/441 |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |

(56) References Cited

U.S. PATENT DOCUMENTS

| | | | |
|---|---|---|---|
| 2014/0002238 A1 | 1/2014 | Taveau et al. | |
| 2014/0014720 A1* | 1/2014 | Sarkis, Jr. | G06F 19/3418 235/382 |
| 2014/0019352 A1 | 1/2014 | Shrivastava | |
| 2014/0027506 A1 | 1/2014 | Heo et al. | |
| 2014/0032409 A1 | 1/2014 | Rosano | |
| 2014/0032410 A1 | 1/2014 | Georgiev et al. | |
| 2014/0040120 A1 | 2/2014 | Cho et al. | |
| 2014/0040139 A1 | 2/2014 | Brudnicki et al. | |
| 2014/0040147 A1 | 2/2014 | Varadarakan et al. | |
| 2014/0047235 A1 | 2/2014 | Lessiak et al. | |
| 2014/0067690 A1 | 3/2014 | Pitroda et al. | |
| 2014/0074637 A1 | 3/2014 | Hammad | |
| 2014/0074655 A1 | 3/2014 | Lim et al. | |
| 2014/0081720 A1 | 3/2014 | Wu | |
| 2014/0136350 A1* | 5/2014 | Savolainen | G06Q 20/341 705/17 |
| 2014/0138435 A1 | 5/2014 | Khalid | |
| 2014/0171034 A1 | 6/2014 | Aleksin et al. | |
| 2014/0171039 A1 | 6/2014 | Bjontegard | |
| 2014/0172700 A1 | 6/2014 | Teuwen et al. | |
| 2014/0180851 A1 | 6/2014 | Fisher | |
| 2014/0208112 A1 | 7/2014 | McDonald et al. | |
| 2014/0214674 A1 | 7/2014 | Narula | |
| 2014/0229375 A1 | 8/2014 | Zaytzsev et al. | |
| 2014/0245391 A1 | 8/2014 | Adenuga | |
| 2014/0256251 A1 | 9/2014 | Caceres et al. | |
| 2014/0258099 A1 | 9/2014 | Rosano | |
| 2014/0258113 A1 | 9/2014 | Gauthier et al. | |
| 2014/0258125 A1 | 9/2014 | Gerber et al. | |
| 2014/0274179 A1 | 9/2014 | Zhu et al. | |
| 2014/0279479 A1 | 9/2014 | Maniar et al. | |
| 2014/0337235 A1 | 11/2014 | Van Heerden et al. | |
| 2014/0339315 A1 | 11/2014 | Ko | |
| 2014/0346860 A1 | 11/2014 | Aubry et al. | |
| 2014/0365780 A1 | 12/2014 | Movassaghi | |
| 2014/0379361 A1 | 12/2014 | Mahadkar et al. | |
| 2015/0012444 A1 | 1/2015 | Brown et al. | |
| 2015/0019355 A1* | 1/2015 | Russell | G06Q 20/28 705/17 |
| 2015/0032635 A1 | 1/2015 | Guise | |
| 2015/0035650 A1* | 2/2015 | Lind | G06Q 10/00 340/10.1 |
| 2015/0071486 A1 | 3/2015 | Rhoads et al. | |
| 2015/0088757 A1 | 3/2015 | Zhou et al. | |
| 2015/0089586 A1 | 3/2015 | Ballesteros | |
| 2015/0134452 A1 | 5/2015 | Williams | |
| 2015/0140960 A1 | 5/2015 | Powell et al. | |
| 2015/0154595 A1 | 6/2015 | Collinge et al. | |
| 2015/0170138 A1 | 6/2015 | Rao | |
| 2015/0178724 A1 | 6/2015 | Ngo et al. | |
| 2015/0186871 A1 | 7/2015 | Laracey | |
| 2015/0205379 A1 | 7/2015 | Mag et al. | |
| 2015/0269477 A1* | 9/2015 | Finn | H01Q 1/38 235/492 |
| 2015/0302409 A1 | 10/2015 | Malek et al. | |
| 2015/0317626 A1 | 11/2015 | Ran et al. | |
| 2015/0332266 A1 | 11/2015 | Friedlander et al. | |
| 2015/0339474 A1 | 11/2015 | Paz et al. | |
| 2015/0371234 A1 | 12/2015 | Huang et al. | |
| 2016/0012465 A1 | 1/2016 | Sharp | |
| 2016/0026997 A1 | 1/2016 | Tsui et al. | |
| 2016/0034724 A1* | 2/2016 | Zumsteg | G06K 7/10386 235/439 |
| 2016/0048913 A1 | 2/2016 | Rausaria et al. | |
| 2016/0055480 A1 | 2/2016 | Shah | |
| 2016/0057619 A1 | 2/2016 | Lopez | |
| 2016/0065370 A1 | 3/2016 | Le Saint et al. | |
| 2016/0087957 A1 | 3/2016 | Shah et al. | |
| 2016/0092696 A1 | 3/2016 | Guglani et al. | |
| 2016/0094560 A1* | 3/2016 | Stuntebeck | H04L 63/08 726/1 |
| 2016/0148193 A1 | 5/2016 | Kelley et al. | |
| 2016/0232523 A1 | 8/2016 | Venot et al. | |
| 2016/0239672 A1 | 8/2016 | Khan et al. | |
| 2016/0253651 A1 | 9/2016 | Park et al. | |
| 2016/0255072 A1 | 9/2016 | Liu | |
| 2016/0267486 A1 | 9/2016 | Mitra et al. | |
| 2016/0277383 A1 | 9/2016 | Guyomarc'h et al. | |
| 2016/0277388 A1 | 9/2016 | Lowe et al. | |
| 2016/0307187 A1 | 10/2016 | Guo et al. | |
| 2016/0307189 A1 | 10/2016 | Zarakas et al. | |
| 2016/0314472 A1 | 10/2016 | Ashfield | |
| 2016/0321053 A1* | 11/2016 | Laurence | G06F 16/1744 |
| 2016/0330027 A1 | 11/2016 | Ebrahimi | |
| 2016/0335531 A1 | 11/2016 | Mullen et al. | |
| 2016/0379217 A1 | 12/2016 | Hammad | |
| 2017/0004502 A1 | 1/2017 | Quentin et al. | |
| 2017/0011395 A1 | 1/2017 | Pillai et al. | |
| 2017/0011406 A1 | 1/2017 | Tunnell et al. | |
| 2017/0017957 A1 | 1/2017 | Radu | |
| 2017/0017964 A1 | 1/2017 | Janefalkar et al. | |
| 2017/0024716 A1 | 1/2017 | Jiam et al. | |
| 2017/0032375 A1* | 2/2017 | Van Os | H04L 67/10 |
| 2017/0039566 A1 | 2/2017 | Schipperheijn | |
| 2017/0041759 A1 | 2/2017 | Gantert et al. | |
| 2017/0068950 A1 | 3/2017 | Kwon | |
| 2017/0103388 A1 | 4/2017 | Pillai et al. | |
| 2017/0104739 A1 | 4/2017 | Lansler et al. | |
| 2017/0109509 A1 | 4/2017 | Baghdasaryan | |
| 2017/0109730 A1 | 4/2017 | Locke et al. | |
| 2017/0116447 A1 | 4/2017 | Cimino et al. | |
| 2017/0124568 A1 | 5/2017 | Moghadam | |
| 2017/0140379 A1 | 5/2017 | Deck | |
| 2017/0154328 A1 | 6/2017 | Zarakas et al. | |
| 2017/0154333 A1 | 6/2017 | Gleeson et al. | |
| 2017/0180134 A1 | 6/2017 | King | |
| 2017/0230189 A1 | 8/2017 | Toll et al. | |
| 2017/0237301 A1 | 8/2017 | Elad et al. | |
| 2017/0289127 A1 | 10/2017 | Hendrick | |
| 2017/0295013 A1 | 10/2017 | Claes | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0238517 A1 | 8/2019 | D'Agostino et al. | |
| 2020/0005114 A1* | 1/2020 | Finn | G06K 19/07794 |
| 2020/0019962 A1* | 1/2020 | Locke | G06Q 20/352 |
| 2020/0302128 A1* | 9/2020 | Rule | G06Q 20/3278 |
| 2021/0037340 A1* | 2/2021 | Mozayeni | H04W 4/026 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |

(56) References Cited

FOREIGN PATENT DOCUMENTS

| | | |
|---|---|---|
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2020072687 A1 | 4/2020 |

OTHER PUBLICATIONS

Dirk Husemann. "The Smart Card: Don't Leave Home Without It". IEEE Concurrency (Apr.-Jun. 1999), pp. 24-27. (Year: 1999).*
Mark T. Smith. "Smart Cards: Integrating for Portable Complexity". Computer (Aug. 1998), pp. 110-112, 115. (Year: 1998).*
Klaus Vedder. "Smart Cards". CompEuro 1992 Proceedings Computer Systems and Software Engineering (1992). pp. 630-635. (Year: 1992).*
Steven B. Weinstein. "Smart credit cards: the answer to cashless shopping". IEEE Spectrum (Feb. 1984), pp. 43-49. (Year: 1984).*
Batina, L. and Poll, E., "SmartCards and RFID", Course PowerPoint Presentation for IPA Security Course, Digital Security at University of Nijmegen, Netherlands (date unknown) 75 pages.
Haykin, M. and Warnar, R., "Smart Card Technology: New Methods for Computer Access Control", Computer Science and Technology NIST Special Publication 500-157:1-60 (1988).
Lehpamer, H., "Component of the RFID System", RFID Design Principles, 2nd edition pp. 133-201 (2012).
Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool", [online] 2018-2019 [retrieved on Mar. 25, 2019]. Retrieved from Internet URL: https://www.authorize.net/our-features/account-updater/, 5 pages.
Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

(56) References Cited

OTHER PUBLICATIONS

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

International Search Report and Written Opinion for International Application No. PCT/US2021/029898 dated Jul. 23, 2021, 10 pages.

* cited by examiner

ACCURATE IMAGES IN GRAPHICAL USER INTERFACES TO ENABLE DATA TRANSFER

TECHNICAL FIELD

Embodiments herein generally relate to computer software, and more specifically, to providing accurate images in graphical user interfaces to enable data transfer.

BACKGROUND

Cardholders (e.g., credit card holders, bank card holders, etc.) often use computer-based applications to perform various account-related activities. Often, the user may be required to tap the card to a computing device to enable data transfer. However, due to device differences, card differences, and any other factors, different orientations and/or placements of the card relative to the computing device may be required to enable data transfer.

SUMMARY

Embodiments disclosed herein provide systems, methods, articles of manufacture, and computer-readable media for providing accurate images of contactless cards in graphical user interfaces on computing devices. According to one example, an application executing on a processor may receive authentication credentials for an account. The application may determine a first contactless payment card associated with the account and a card manufacturer identifier (CMID) of the first contactless payment card. The application may receive, from a digital asset management system based on the CMID, a plurality of images of the first payment card and a plurality of metadata attributes of the first contactless payment card. The application may determine, based on the plurality of metadata attributes of the first contactless payment card and a plurality of attributes of the mobile device, a first orientation of the first contactless payment card to enable near-field communication (NFC) data transfer between the first contactless payment card and the mobile device. The application may select a first image of the plurality of images depicting the first contactless payment card according to the first orientation. The application may generate a graphical user interface (GUI) depicting the first image of the plurality of images of the first contactless payment card and an indication specifying to tap the first contactless payment card to the mobile device according to the first orientation and display the GUI on a display.

DETAILED DESCRIPTION

Figure 1A:
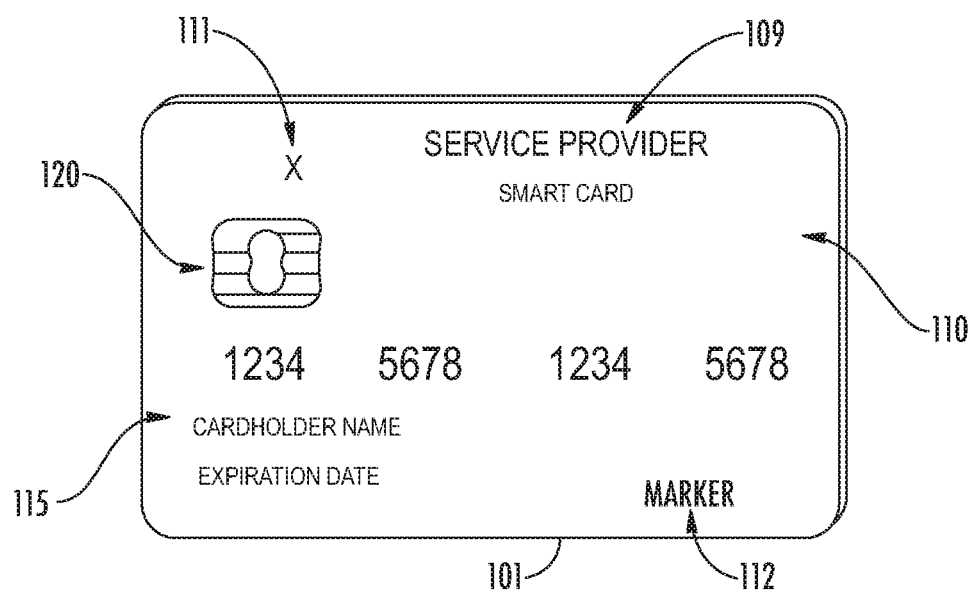
FIGS. 1A-1B illustrate an example contactless card.

Embodiments disclosed herein provide accurate images of payment cards for use in graphical user interfaces (GUIs) on computing devices based at least in part on metadata of the payment cards. The accurate images of the payment cards in the GUIs may assist users in orienting the payment card relative to the computing device in a manner that enables data transfer between the payment card and the computing device. Generally, when a payment card is manufactured, the payment card may be assigned a unique card manufacture identifier (CMID) the uniquely identifies the card. Furthermore, one or more images of the card (and/or one or more base images of a type of the card) may be stored in a digital asset management (DAM) system along with metadata attributes describing the card.

When a user logs in to their account in an application, the CMID of one or more cards associated with the account may be determined by the application. The application may then use the CMID to query the DAM system to receive the one or more images of the card and the metadata attributes of the card. The application may further determine one or more attributes of the computing device on which the application is executing. Based on the card attributes and/or device attributes, the application may determine an orientation of the card (e.g., front-facing) that would result in optimal data transfer between the card and the device (relative to other orientations of the card). The application may then select at least one image of the card received from the DAM system that depicts the card in the determined orientation (e.g., front-facing). The application may then generate a GUI using the selected image of the card. The GUI may further depict the selected image of the card being brought within communications range of the computing device (e.g., tapping the card while front-facing to the screen of the computing device). Doing so may facilitate data transfer between the card and computing device without requiring multiple attempts to initiate data transfer.

Furthermore, when base images of the card are selected, additional data may be overlaid on the base images to make the base image appear more similar to the actual physical card. For example, the account holder's name, the card number, expiration date, and card verification value (CVV) may be overlaid on the base image of the card. One or more logos may also be overlaid on the card based on the logos depicted on the physical card. Further still, other assistive elements may be depicted in the GUI. For example, dashed guidelines may depict an outline of where the card should be placed relative to the computing device.

As another example, a camera of the computing device may be used to identify different features of the physical card in possession of the user. For example, the camera may capture an image of the physical card and the application may analyze the captured image to perform additional features. In one embodiment, a color of the physical card depicted in the image may be used to determine if the user is using the correct card for a requested operation in the application. For example, if the user is attempting to transfer funds using a first card having metadata attributes indicating the card is red, the image may depict a blue card. Based on the different colors, the application may inform the user that the incorrect card is being used. As another example, a graphical marker may be written on the card. In some embodiments, the graphical marker may not be visible to the human eye but may be detected by the camera. The graphical marker may be used to retrieve different attributes of the card. For example, the graphical marker may be a matrix barcode that is directed to a uniform resource locator (URL) for the card in the DAM system. Doing so may allow the application to determine attributes of the card, determine whether the user is using the correct card, etc.

Advantageously, embodiments disclosed herein improve graphical user interfaces by providing accurate images of specific cards in the GUIs. The use of accurate images of the card may result in an optimal orientation of the card relative to the computing device, thereby enabling faster, more reliable, wireless data transfer between the card and the device relative to other orientations of the card/device. Similarly, using accurate images to result in the optimal orientation of the card relative to the computing device may enable data transfer that would not be enabled with other orientations (e.g., where data transfer is restricted due to one or more other orientations). Doing so may improve performance of the computing device by requiring fewer power and other resources when communicating with the card.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A illustrates a contactless card 101, which may comprise a payment card, such as a credit card, debit card, and/or a gift card. As shown, the contactless card 101 may be issued by a service provider 109 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 110, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 115 displayed on the front and/or back of the card, and a contact pad 120. The contact pad 120 may be configured to establish contact with another communication device, such as a user device, smartphone, laptop, desktop, or tablet computer. The contactless card 101 may also include processing circuitry, antenna and other components not shown in FIG. 1A. These components may be located behind the contact pad 120 or elsewhere on the substrate 110. The contactless card 101 may also include a magnetic strip or tape, which may be located on the back of the card (not shown in FIG. 1A).

Figure 1B:
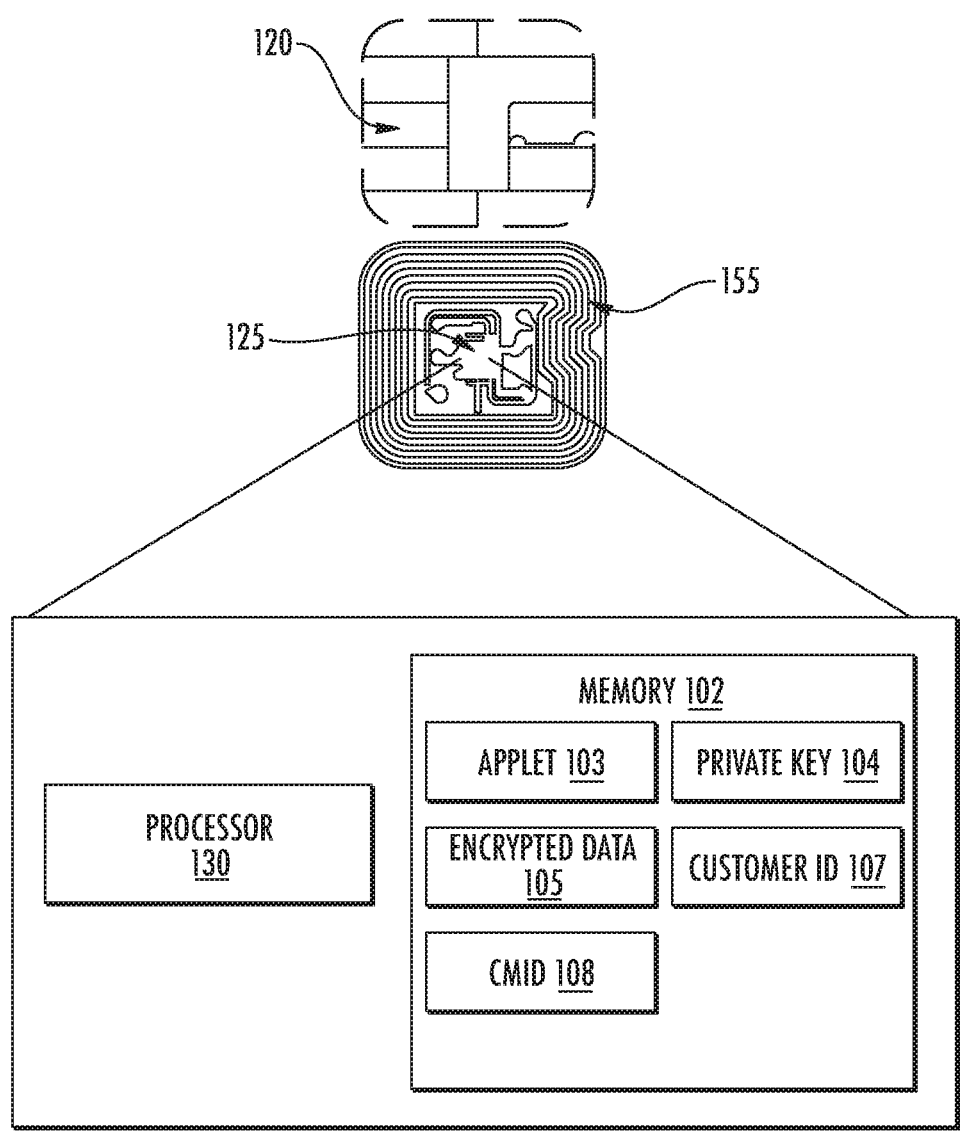

As illustrated in FIG. 1B, the contact pad 120 of contactless card 101 may include processing circuitry 125 for storing and processing information, including a microprocessor 130 and the memory 102. It is understood that the processing circuitry 125 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store one or more applets 103, a private key 104, encrypted data 105, one or more customer (or user) identifiers (IDs) 107, and a card manufacture ID (CMID) 108. In some embodiments, the CMID 108 is not stored in the memory 102. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The customer ID 107 may comprise a unique alphanumeric identifier assigned to a user of the contactless card 101, and the identifier may distinguish the user of the contactless card from other contactless card users. In some examples, the customer ID 107 may identify both a customer and an account assigned to that customer and may further identify the contactless card associated with the customer's account. In some embodiments, the applet 103 may use the customer ID 107 as input to a cryptographic algorithm with the private key 104 to generate encrypted data 105.

The processor and memory elements of the foregoing exemplary embodiments are described with reference to the contact pad, but the present disclosure is not limited thereto. It is understood that these elements may be implemented outside of the pad 120 or entirely separate from it, or as further elements in addition to processor 130 and memory 102 elements located within the contact pad 120.

In some examples, the contactless card 101 may comprise one or more antennas 155. The one or more antennas 155 may be placed within the contactless card 101 and around the processing circuitry 125 of the contact pad 120. For example, the one or more antennas 155 may be integral with the processing circuitry 125 and the one or more antennas 155 may be used with an external booster coil. As another example, the one or more antennas 155 may be external to the contact pad 120 and the processing circuitry 125.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 155, processing circuitry 125, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., the card reader 218 of the device 210 of FIGS. 2A-2C), and produce an NDEF message that comprises a cryptographically secure OTP encoded as an NDEF text tag.

In some embodiments, the contactless card 101 may include one or more locations that are associated with optimal placement relative to a card reader to enable data transfer. In some embodiments, the one or more optimal locations may include the processing circuitry 125, the contact pad 120, the antenna 155, the coil, or some other location on the surface of the contactless card 101. For example, returning to FIG. 1A, the location 111 may be one optimal location for tapping the contactless card 101 to a card reader. However, because different materials may be used to produce a given contactless card 101, the location 111 may differ across different contactless cards 101. In some embodiments, the location 111 may be stored as a metadata attribute of a contactless card 101 (or a type of contactless card), e.g., in the DAM 225 of FIG. 2A. As shown, the contactless card 101 may further include a graphical marker 112. In some embodiments, the graphical marker 112 is not visible to the human eye but may be detected by a camera or other scanning device. The marker 112 may include any type of marker, such as a matrix barcode, matrix code, fiducial marker, and the like. The marker 112 may be used to encode metadata attributes of the contactless card 101, such as card type, one or more optimal locations 111, materials used to manufacture the contactless card 101, and the like.

Figure 2A:
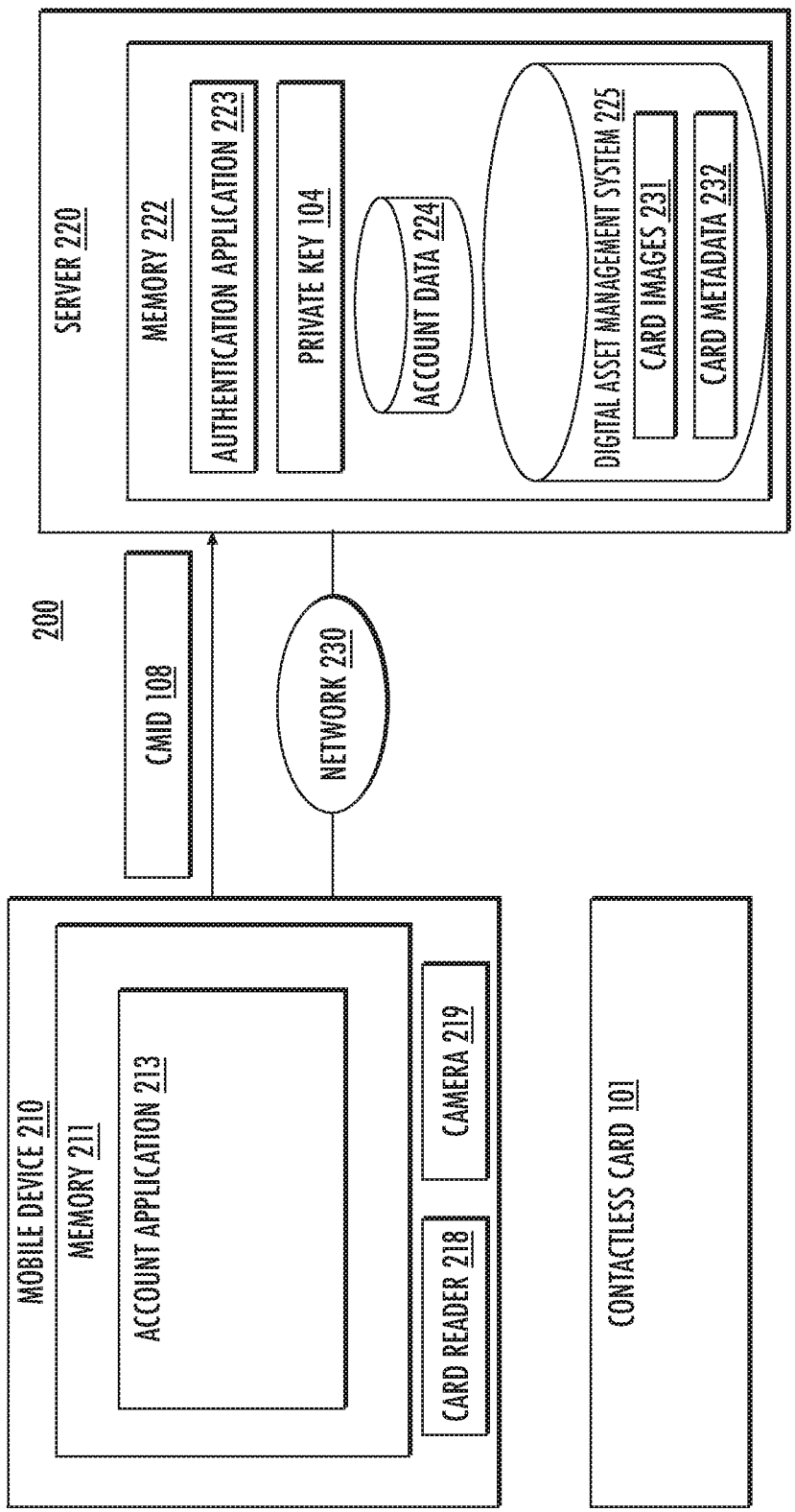
FIGS. 2A-2C illustrate embodiments of a system for providing accurate images of contactless cards in graphical user interfaces to enable data transfer.

FIG. 2A depicts a schematic of an exemplary system 200, consistent with disclosed embodiments. As shown, the system 200 includes one or more contactless cards 101, one or more mobile computing devices 210, and a server 220. As stated, the contactless cards 101 may comprise one or more communications interfaces, such as a radio frequency identification (RFID) chip, configured to communicate with the devices 210 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The mobile devices 210 are representative of any type of network-enabled computing devices, such as smartphones, tablet computers, wearable devices, laptops, portable gaming devices, and the like. The server 220 is representative of any type of computing device, such as a server, workstation, compute cluster, cloud computing platform, virtualized computing system, and the like.

The computing device 210 and the server may be under the control of an operating system (OS) (not pictured). Example operating systems include the Android® OS, iOS®, macOS®, Linux®, and Windows® operating systems. As shown, a memory 211 of the computing device 210 includes an account application 213. The account application 213 allows users to perform various account-related operations, such as viewing account balances, purchasing items, processing payments, account selection, balance transfer, activation of contactless cards 101, and generating virtual account numbers associated with a contactless card 101. In some embodiments, a user may authenticate using authentication credentials to access certain features of the account application 213. For example, the authentication credentials may include a username and password, biometric credentials (e.g., fingerprints, Face ID, etc.), and the like.

As shown, a memory 222 of the server 220 includes an authentication application 223, a data store of account data 224, and a digital asset management (DAM) system 225. The authentication application 223 may interface with the account application 213. For example, as described in greater detail below, the authentication application 223 may authenticate encrypted data 105 generated by the contactless card 101 based on copies of the private key 104 and the customer ID 107 that are locally accessible to the server 220. The account data 224 generally stores account-related information for each of a plurality of users. For example, the account data 224 may indicate one or more contactless cards 101 associated with each account and a CMID of each card 101. The DAM system 225 stores information describing different assets, such as the contactless cards 101.

As stated, when a contactless card 101 is manufactured, the contactless card 101 may be assigned a CMID 108 which uniquely identifies the card. The CMID 108 may be stored in the user profile of the associated cardholder in the account data 224 and/or the DAM system 225. Furthermore, one or more images 231 of the card 101 may be stored in the DAM system 225 with metadata attributes 232 describing the card 101 (e.g., materials used to manufacture the card, one or more locations associated with optimal wireless data transfer, physical arrangement of the components of the contactless card depicted in FIGS. 1A-1B, one or more known limitations of the card (e.g., that the card 101 cannot be read when the back side of the card 101 is tapped to a device 210), etc.). The images of a given card 101 may be generic to a type of card (e.g., one or more base images of a given type of card, where a plurality of different types of cards may exist) and/or images of the actual physical card 101 itself.

As stated, users of the account application 213 may generally attempt to perform any number of operations. Often, wireless data transfer between the contactless card 101 and the device 210 may be required to authorize an operation, such as generating a one-time-use virtual account number for the contactless card 101. However, users may often use an improper orientation of the card 101 and the device 210, which may restrict or otherwise slow data transfer between the card 101 and the device 210. For example, a user may attempt to tap the card 101 to the screen of the device 210. However, on some devices and/or for some cards 101, NFC data transfer cannot occur when the card 101 is on the screen of the device 210. Instead, in some embodiments, the card 101 must be tapped to the back of the device 210 to enable NFC data transfer. Advantageously, however, the account application 213 may generate GUIs which depict an exact image of the card 101 being tapped to the device 210 in the proper orientation and/or placement. The GUIs of the account application 213 may further provide visual markers that assist users in proper placement and orientation of the card 101 relative to the device 210. Doing so may improve data transfer capabilities and/or data transfer rates between the card 101 and device 210.

To generate the GUIs including accurate images of the card 101, the account application 213 may receive the CMID 108 of the card 101. For example, the account application 213 may receive the CMID 108 stored in the memory of the card 101 via wireless data transfer. In another example, the account application 213 may receive the CMID 108 from the account data 224 of the server 220 when the user provides authentication credentials that are authorized by the server 220. In another example, the account application 213 may store a local instance (not pictured) of the account data 224 for the user account and receive the CMID 108 for each card associated with the account from the local instance of the account data 224. The CMID 108 may generally identify a type, or style of the card (e.g., a metallic card of a first card type). In some examples, the user may tap the card 101 to the device 210 prior to logging into an account via the account application 213. In such examples, the CMID 108 may be received directly from the card and/or received from the account data 224 of the server 220.

Figure 2B:
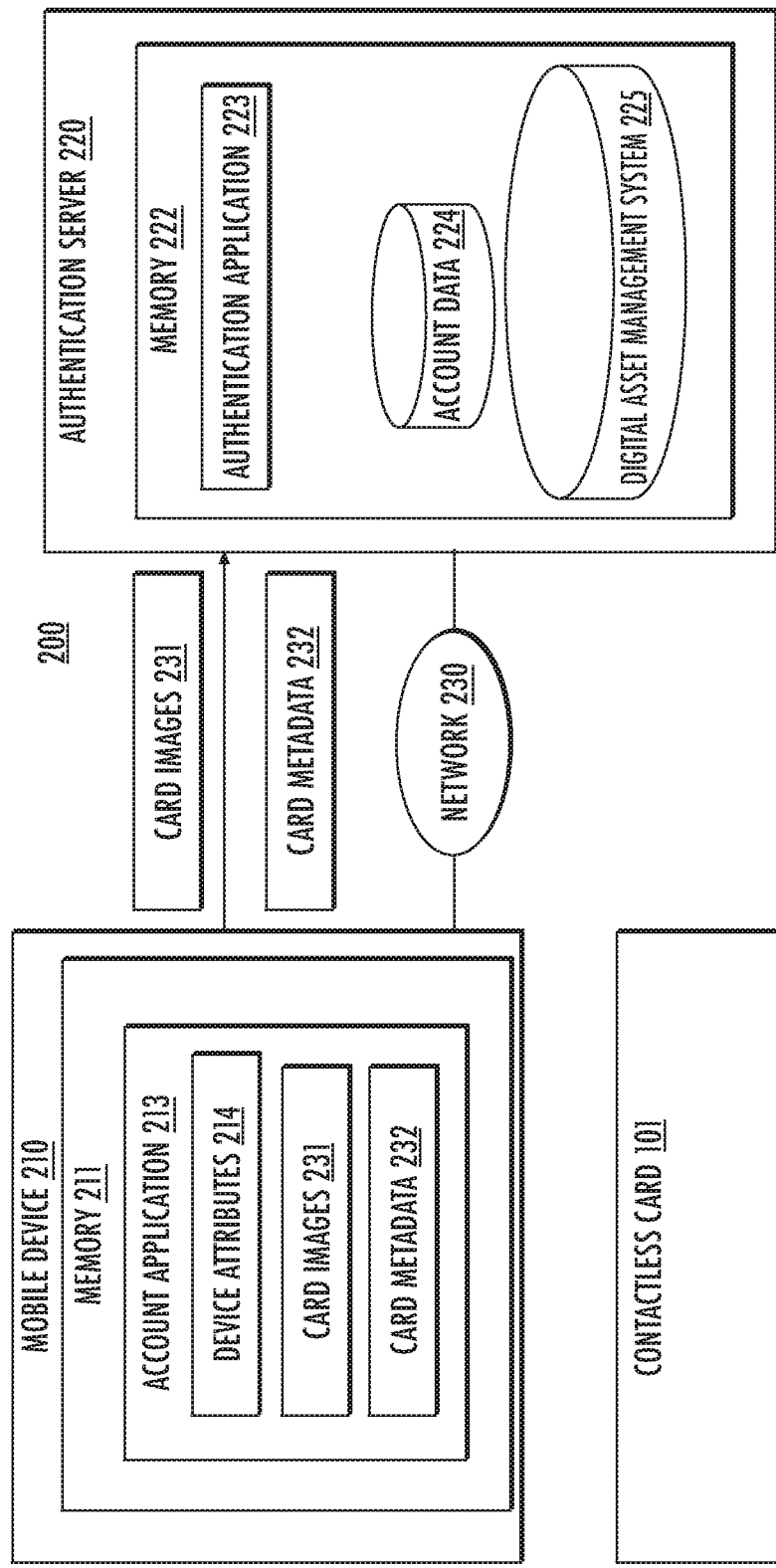
Figure 2C:
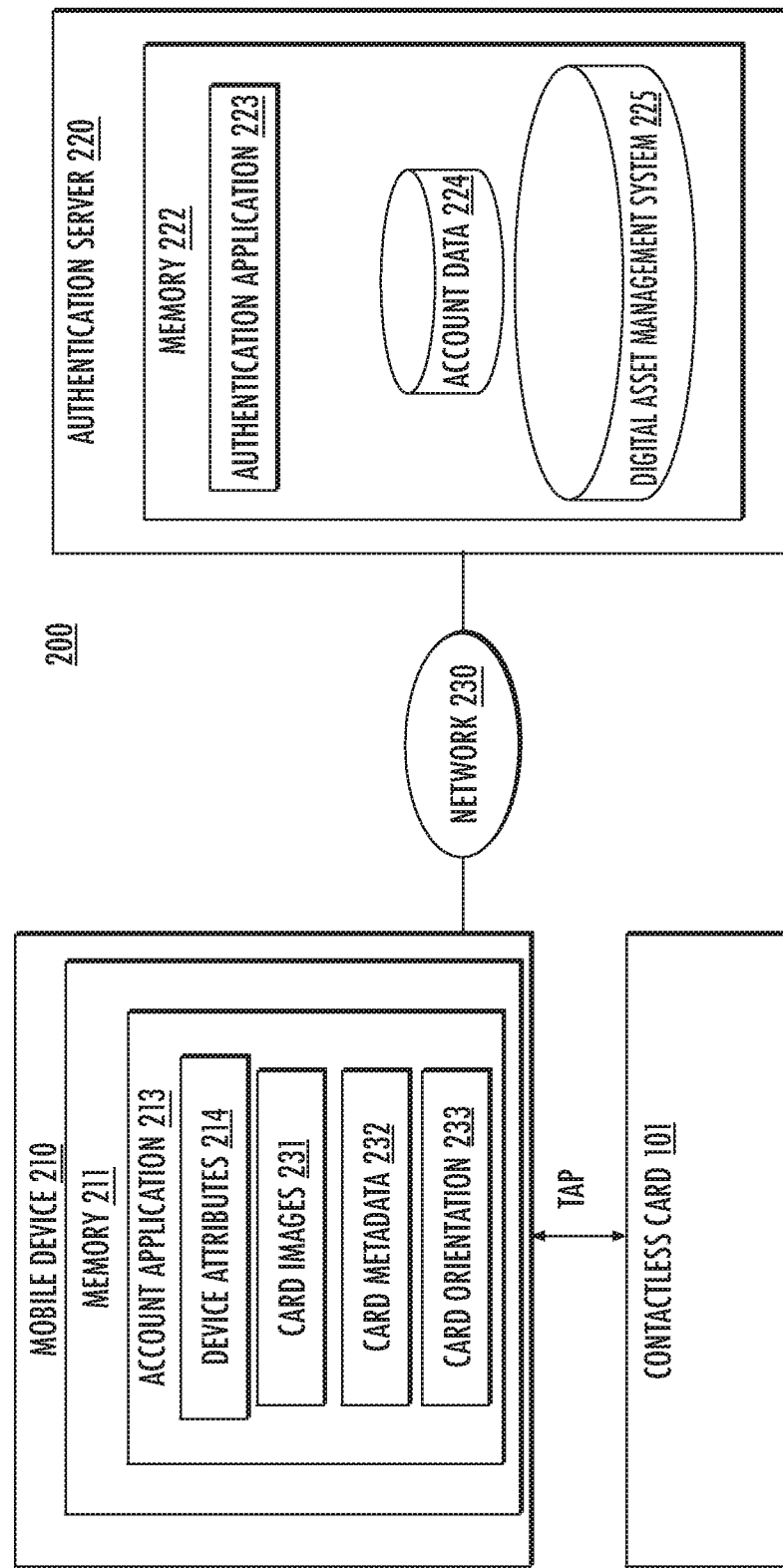

Regardless of the technique used to receive the CMID 108, the account application 213 may use the CMID 108 to query the DAM system 225. FIG. 2B depicts an embodiment where the DAM system 225 returns one or more images 231 and card metadata 232 associated with the CMID 108 of the card 101. As depicted in FIG. 2C, the account application 213 may determine an optimal orientation 233 of the contactless card 101 for depiction in a GUI to assist the user.

The optimal orientation 233 may be based on the card metadata 232 and device attributes 214 of the device 210. For example, the device attributes 214 of the device 210 may specify that the device 210 requires the contactless card 101 to be tapped to the screen of the device 210 to enable NFC data transfer. The device attributes 214 and/or the card metadata 232 may further specify that the card 101 must be front-side up when tapped to a given device 210. As such, the account application 213 may determine that the optimal orientation 233 of the card 101 is front-side up (e.g., the front surface of the card depicted in FIG. 1A). The account application 213 may then select an image 231 depicting the card in a front-side up orientation. The account application 213 may further select the image 231 that depicts the card in a rotated orientation, such that one or more reference markers of the card 101 (e.g., the contact pad 120, the point 111, etc.) align with one or more markers of the device attributes 214. The images 231 may generally include a plurality of different images of a given card 101 from a plurality of different angles and/or orientations. Furthermore, the images 231 may include specific visual elements of a contactless card 101, such as logos, colored templates, and the like.

More generally, the card metadata 232 may generally include any type of metadata attribute for a given contactless card 101. The card metadata 232 may be different for different cards, as different materials may be used to construct different types of cards. Furthermore, because of the way a card is constructed (and/or the components used to construct the card), the card 101 may favor one side (e.g., the left side, right side, front side, back side, etc.). Therefore, the card metadata 232 may specify one or more materials used to manufacture the contactless card 101 (e.g. the substrate 110), the components used in the contactless card 101 (e.g., the antenna 155, circuitry 125, and other elements depicted in FIGS. 1A-1B), placement of the components (e.g., a location of the antenna 155 of the contactless card 101, a location of the processing circuitry 125 of the contactless card 101, etc.), one or more colors on the surface of the contactless card 101, one or more logos or other artwork on the surface of the contactless card 101, and one or more locations 111 (or points) on the surface of the contactless card 101 that are optimal locations for data transfer. As additional examples, the card metadata 232 may specify a default orientation for data transfer. The orientation may be vertical and/or horizontal. Additionally and/or alternatively the orientation may be face-up or face-down. Doing so may allow the account application 213 to determine an optimal orientation and location for tapping the contactless card 101 to a device 210.

The device attributes 214 may include any type of metadata attribute for a type of device 210. Often, different devices 210 have different properties which require different placement locations to enable wireless data transfers with the contactless card 101. Therefore, the device attributes 214 may specify a location of an NFC antenna of the card reader 218 of the device 210, a location on the surface of the device 210 where the contactless card 101 is to be tapped to enable NFC data transfer (e.g., on the front surface, on the rear surface, on the display, etc.). The device attributes 214 may further specify default orientations for the contactless card 101 (e.g., face-up and/or face-down, vertical and/or horizontal, etc.). Doing so may allow the account application 213 to determine an optimal orientation and location for tapping the contactless card 101 to a specific device 210.

In some embodiments, the image 231 may be a base image of a specific type of card, rather than an image of the actual physical card 101 itself. To provide more accurate images, the account application 213 may overlay data on the selected image 231. For example, the account application 213 may overlay the user's name, the account number of the card 101, the expiration date of the card 101, and/or the CVV of the card 101. In addition and/or alternatively, the account application 213 may overlay an image including a logo depicted on the card 101. The image with the logo may be received from the DAM 225 and may be associated with the CMID 108 of the contactless card 101. Doing so may provide more accurate images of the card 101, as the logos on a given type of card may change over time.

As shown, in FIG. 2A, the device 210 includes a camera 219. The camera 219 may be a front-facing and/or rear-facing camera. The camera 219 may capture images when an instructional GUI is being depicted to assist the user in tapping the contactless card 101 to the device 210. For example, the front-facing camera 219 may capture an image and determine that the card 101 is covering the camera 219 based on analysis of the image performed by the account application 213 using image recognition and/or computer vision algorithms. The account application 213 may further determine that data transfer has not started between the card 101 and the device 210. Therefore, the account application 213 may generate an audio and/or visual alert indicating to change the orientation of the contactless card 101. For example, the account application 213 may select a different image 231 of the card 101 that depicts the card 101 according to a different orientation. The account application 213 may then output the selected image in the GUI to assist the user.

As another example, the account application 213 may analyze an image captured by the camera 219 and determine that a blue contactless card 101 is depicted in the image. However, the account application 213 may determine that the blue color of the contactless card 101 does not match a known red color of the card 101 being used to perform an operation (e.g., to process a transfer of funds, generate a virtual account number, etc.). In one embodiment, the red color of the card 101 may be specified as card metadata 232 received from the DAM 225. In addition and/or alternatively, the account application 213 may determine that the color of the card 101 should be red based on the card images 231 received from the DAM 225. If the color of the card in the image captured by the camera 219 does not match the known color of the card 101, the account application 213 may generate and output a notification specifying that the correct card is not being used. In some embodiments, detection of a different card 101 may indicate attempted fraud. For example, when detecting the blue card, the account application 213 may identify fraudulent activity, and generate a fraud alert.

In another example, the account application 213 may detect the marker 112 in an image captured by the camera 219. Doing so may allow the account application 213 to determine whether the correct card is being presented. Doing so may also allow the account application 213 to determine one or more attributes of the contactless card 101. For example, the account application 213 may decode the marker 112 to determine one or more elements of card metadata 232 (e.g., a color of the card, a type of the card, a material used to manufacture the card, etc.). As another example, the marker 112 may encode (or otherwise be associated with) a URL directed to a record for the contactless card 101 in the DAM system 225. The account application 213 may therefore receive one or more images 231 and/or elements of card metadata 232 from the DAM system 225 (e.g., by accessing the decoded URL).

In some embodiments, the account application 213 may be opened responsive to a tap of the contactless card 101 to the device 210 (e.g., when the user is interacting with a different application). When the card 101 is tapped to the device 210, the contactless card 101 is brought sufficiently close to the card reader 218 of the computing device 210. Doing so enables data transfer (e.g., NFC data transfer, Bluetooth data transfer, etc.) between the communications interface (e.g., at least the antenna and coil of FIG. 1B) of the contactless card 101 and the card reader 218 of the computing device 210. The applet 103 of the contactless card 101 may then generate and transmit encrypted data 105 to the computing device 210. For example, the applet 103 of the contactless card 101 may use a cryptographic algorithm to generate a cryptographic payload of encrypted data 105 based at least in part on the private key 104 stored in the memory 102 of the contactless card 101. In such an embodiment, the private key 104 and some other piece of data (e.g., a customer identifier, an account identifier, etc.) may be provided as the input to the cryptographic algorithm, which outputs the encrypted data 105. Generally, the applet 103 may use any type of cryptographic algorithm and/or system to generate the encrypted data 105, and the use of a specific cryptographic algorithm as an example herein should not be considered limiting of the disclosure. In some embodiments, the applet 103 may perform encryption using a key diversification technique to generate the encrypted data 105. Examples of key diversification techniques are described in U.S. patent application Ser. No. 16/205,219, filed Nov. 29, 2018. The aforementioned patent application is incorporated by reference herein in its entirety.

Once generated, the applet 103 may transmit the encrypted data 105 to the account application 213 of the computing device 210, e.g., via NFC. The account application 213 may transmit the encrypted data 105 to the authentication application 223 of the server 220. Once received, the authentication application 223 may authenticate the encrypted data 105. For example, the authentication application 223 may attempt to decrypt the encrypted data 105 using a cryptographic function and copy of the private key 104 stored by the server 220. The private key 104 may be identical to the private key 104 stored in the memory 102 of the contactless card 101, where each contactless card 101 is manufactured to include a unique private key 104 (and the server 220 stores a corresponding copy of each unique private key 104). Therefore, the authentication application 223 may successfully decrypt the encrypted data 105, thereby verifying the encrypted data 105. Although the private key 104 is depicted as being stored in the memory 222, the private key 104 may be stored elsewhere, such as in a secure element and/or a hardware security module (HSM). In such embodiments, the secure element and/or the HSM may decrypt the encrypted data 105 using the private key 104 and a cryptographic function.

For example, as stated, the customer ID 107 may be used to generate the encrypted data 105. In such an example, the authentication application 223 may decrypt the encrypted data 105 using the private key 104 of the server 220. If the result of the decryption yields the customer identifier associated with the account in the account data 224, the authentication application 223 verifies the encrypted data 105. If the authentication application 223 is unable to decrypt the encrypted data to yield the expected result (e.g., the customer identifier of the primary account associated with the contactless card 101), the authentication application 223 does not validate the encrypted data 105. Upon verification of the encrypted data 105, the authentication application 223 may determine the CMID 108 of the contactless card 101 from the account data 224. The authentication application 223 may then instruct the DAM 225 to send the card images 231 and metadata 232 corresponding to the determined CMID 108 to the account application 213.

Figure 3A:
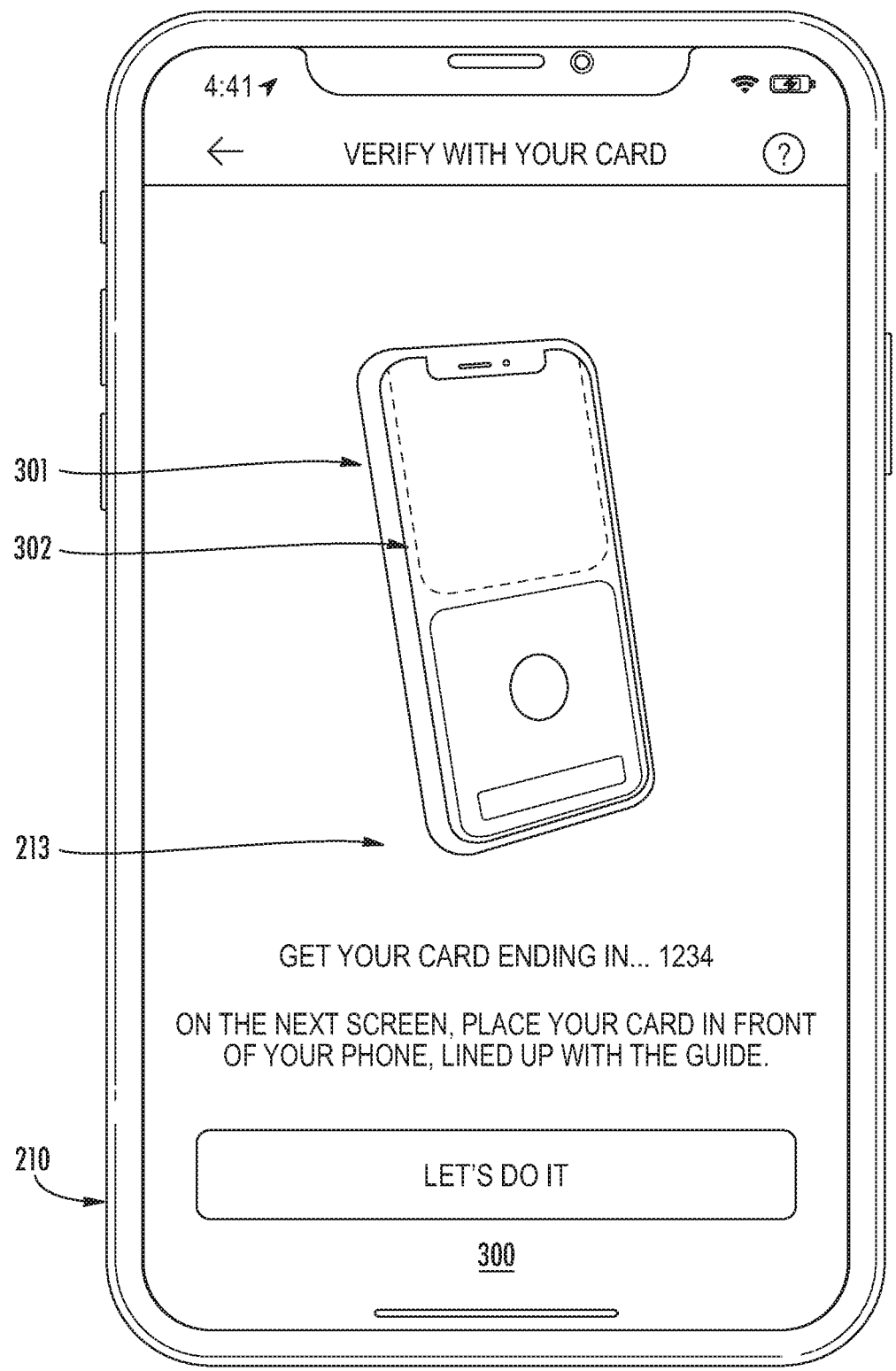
FIGS. 3A-3B illustrate example graphical user interfaces including accurate images of contactless cards to enable data transfer with computing devices.

FIG. 3A illustrates an example GUI 300 generated by the account application 213 executing on a device 210. As stated, in some embodiments, a user may provide authentication credentials prior to the GUI 300 being generated by the account application 213. Furthermore, the user may specify to perform a type of operation prior to the GUI 300 being generated (e.g., balance transfer, virtual account number generation, etc.). As shown, the GUI 300 depicts an example mobile device 301. The GUI 300 further depicts an optimal placement location 302 (in dashed lines) for placing a contactless card 101 to enable data transfer. The placement location 302 may generally be based on the device attributes 214 of the device 210 and/or the card metadata 232 of the contactless card 101.

Figure 3B:
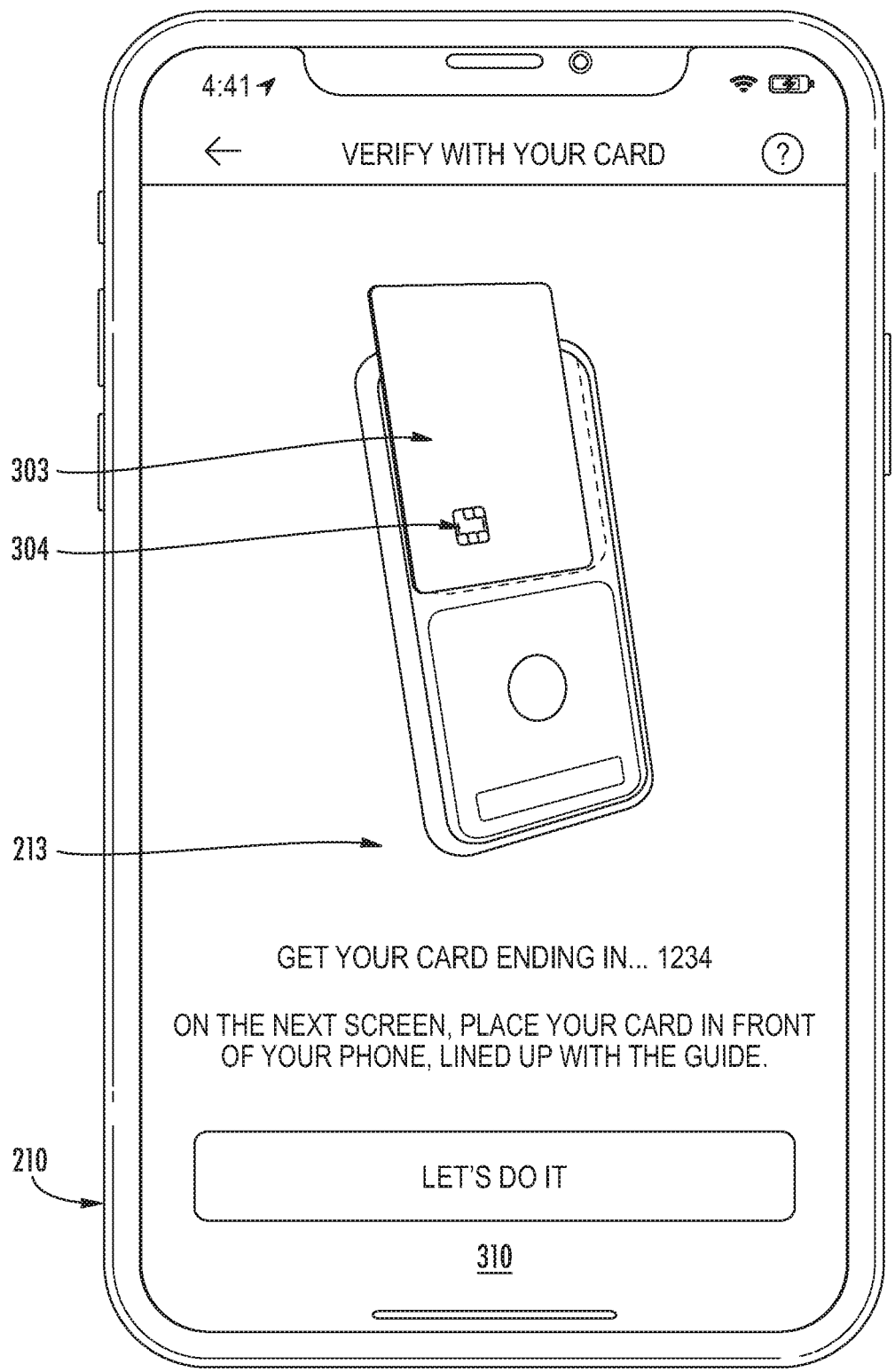

FIG. 3B illustrates an example GUI 310 generated by the account application 213. The GUI 310 may be associated with the GUI 300 of FIG. 3A, e.g., the GUI 310 may be outputted subsequent to the GUI 300. As shown, the GUI 310 depicts an image 303 of a contactless card 101. The image 303 may be one of the card images 231 received from the DAM 225 based on the CMID of the contactless card 101 associated with the account of an authenticated user. The account application 213 may select the image 303 based on the card metadata 232 of the contactless card 101 and/or the device attributes 214 of the device 210. As shown, the image 303 of the contactless card 101 depicts the contactless card 101 in a vertical, face-up orientation, which may be determined to be the optimal orientation by the account application 213. As shown, the GUI 310 may further include a contact pad 304, which may be part of the optimal orientation determined by the account application 213. Doing so allows the user to subsequently tap the contactless card 101 to the device 210 according to the orientation and/or locations depicted in FIGS. 3A-3B.

Figure 4A:
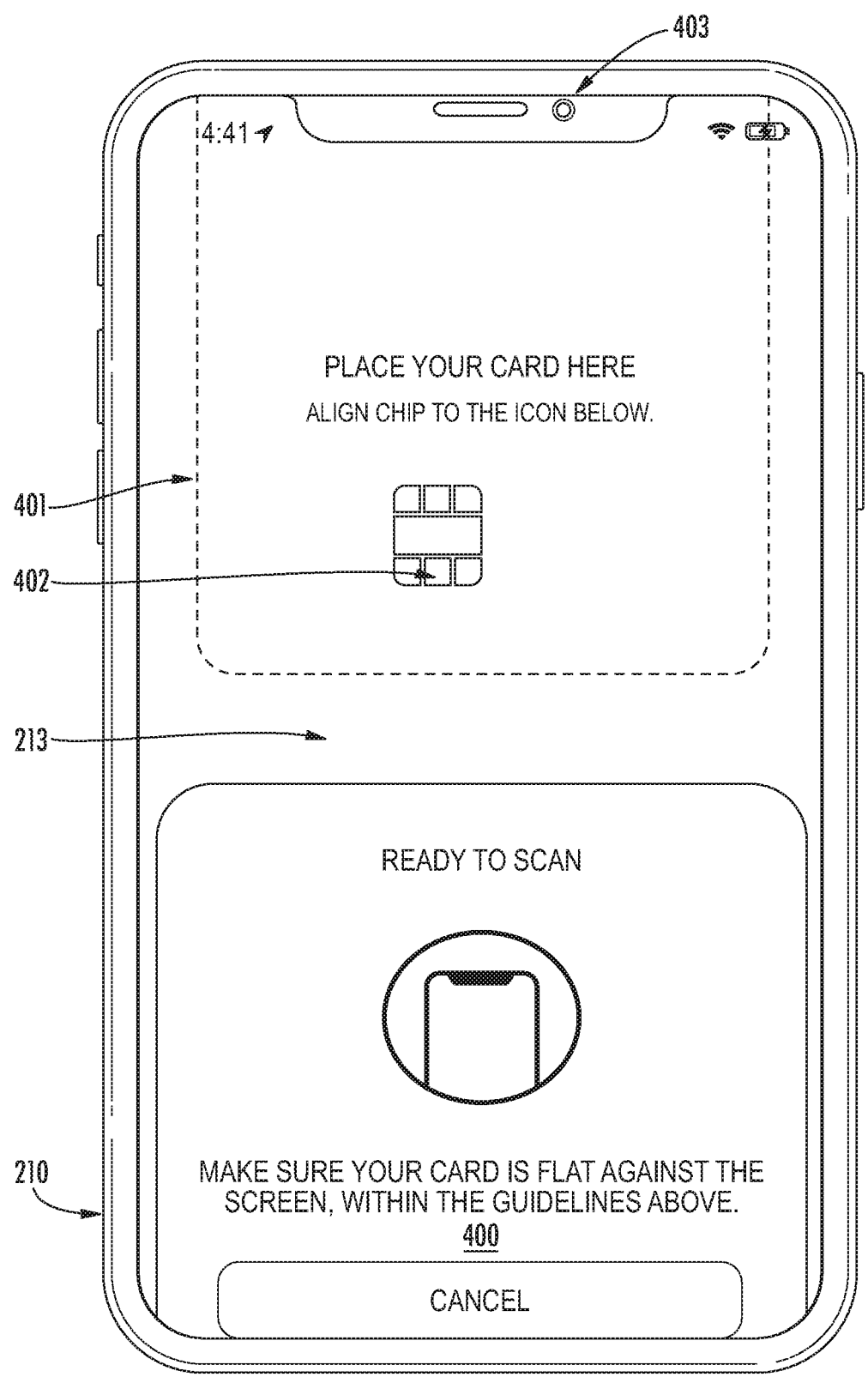
FIGS. 4A-4B illustrate example graphical user interfaces including accurate images of contactless cards to enable data transfer with computing devices.

FIG. 4A illustrates an example GUI 400 generated by the account application 213 executing on a device 210. As shown, the GUI 400 includes an outline 401 (dashed lines) depicting where on the device 210 the user should place the contactless card 101 to enable data transfer (and/or enable faster data transfer relative to other orientations and/or placements). Furthermore, the GUI 400 includes an outline 402 of the contact pad of the contactless card 101. The GUI 400 may generally be based on the device attributes 214 of the device 210 and/or the card metadata 232 of the contactless card 101.

Figure 4B:
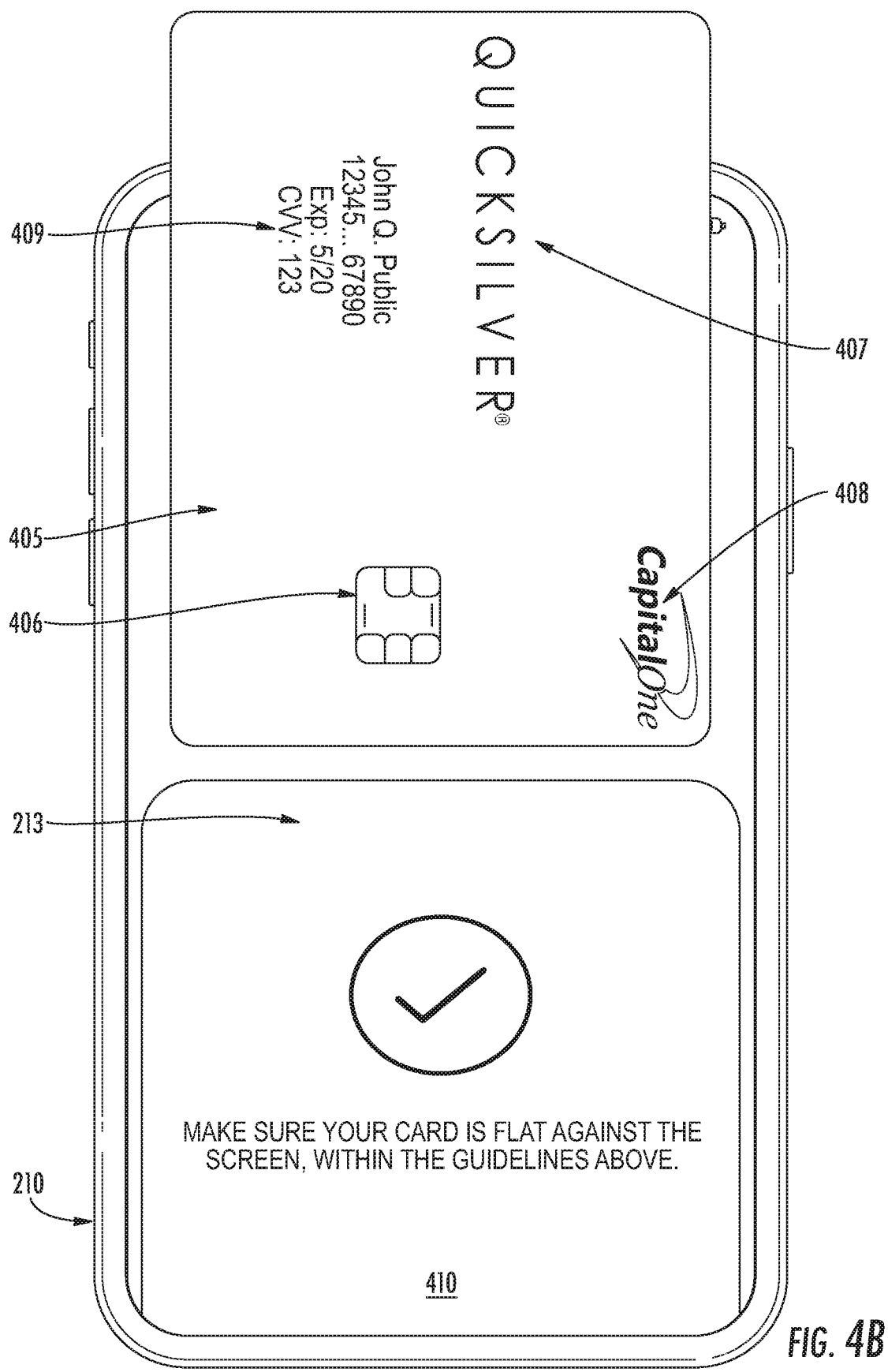

FIG. 4B illustrates an example GUI 410 generated by the account application 213 executing on a device 210. The GUI 410 may be associated with the GUI 400 of FIG. 4A, e.g., the GUI 410 may be outputted subsequent to the GUI 400. As shown, the GUI 410 includes an image 405 of a contactless card 101 according to a vertical, face-up orientation. The GUI 410 further includes a graphical contact pad 406, allowing the user to determine the proper orientation of the card 101 to the device 210. As shown, the image 405 of the contactless card 101 further includes one or more logos 407, 408 overlaid on the image 405. Furthermore, the image 405 includes overlaid user-specific attributes 409, e.g., card number, expiration date, CVV, and cardholder name.

Returning to FIG. 4A, a front-facing camera 403 of the device 210 is depicted. The camera 403 may correspond to the camera 219 and may capture images used by the account application 213. For example, if the user places the contactless card 101 over the camera 403, an image captured by the camera 403 may be obscured by the card 101. Therefore, the account application 213 may determine whether data transfer has been initiated between the contactless card 101 and the device 210. If data transfer has not been initiated and the image captured by the camera 403 indicates the card is covering the camera 403, the account application 213 may output an alert to the user to adjust the orientation and/or location on the device 210 where the card is being tapped.

Figure 5A:
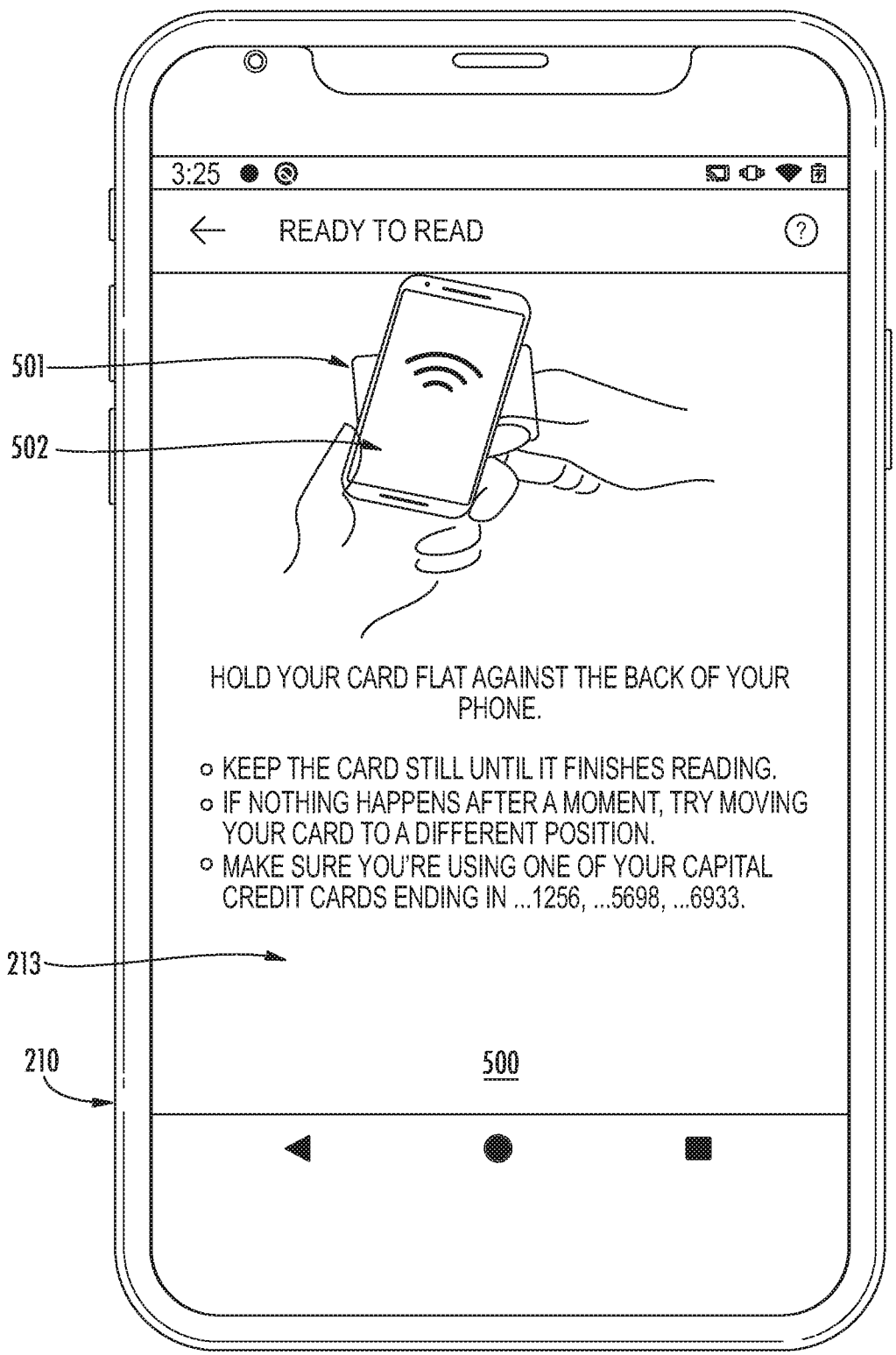
FIGS. 5A-5B illustrate example graphical user interfaces including accurate images of contactless cards to enable data transfer with computing devices.

FIG. 5A illustrates an example GUI 500 generated by the account application 213 executing on a device 210. The GUI 500 may generally be based on the device attributes 214 of the device 210 and/or the card metadata 232 of the contactless card 101. As shown, the GUI 500 includes an image 501 of a contactless card 101 and an image 502 of the device 210. The GUI 500 depicts the contactless card 101 being tapped to the rear surface of the mobile device 210.

Figure 5B:
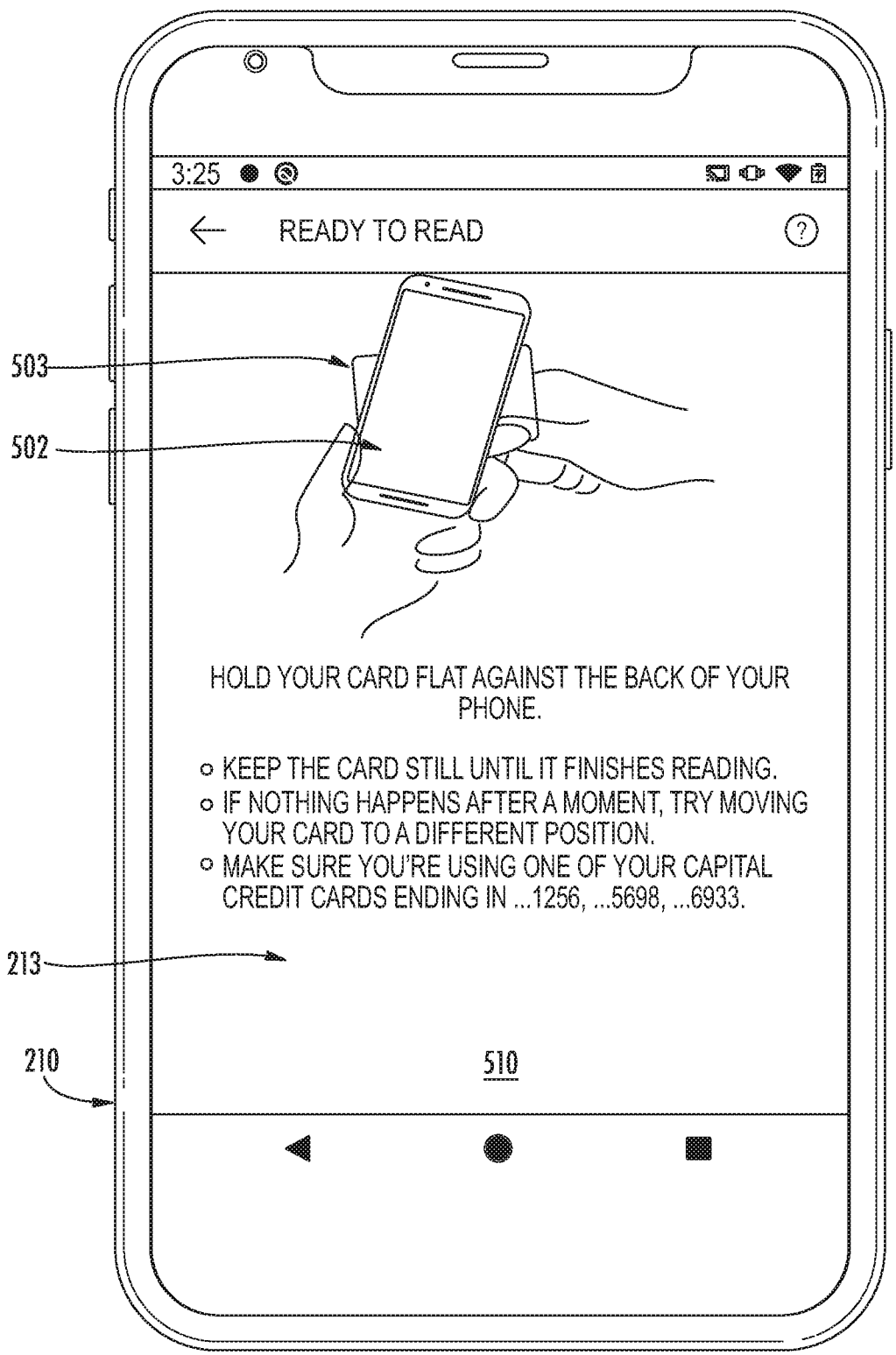

FIG. 5B illustrates an example GUI 510 generated by the account application 213. As shown, the GUI 510 depicts an image 503 of the contactless card 101 in a different position relative to the device 502. In some embodiments, the GUI 510 is generated responsive to the account application 213 determining data transfer has not been initiated between the card 101 and the device 210 within a threshold amount of time. As another example, the images 501, 503 may correspond to two default placement locations and/or orientations for the contactless card 101 relative to the device 210. Therefore, the account application 213 may output the GUI 500 and/or the GUI 510 to assist the user in ensuring that data transfer is initiated when tapping the contactless card 101 to a device 210.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
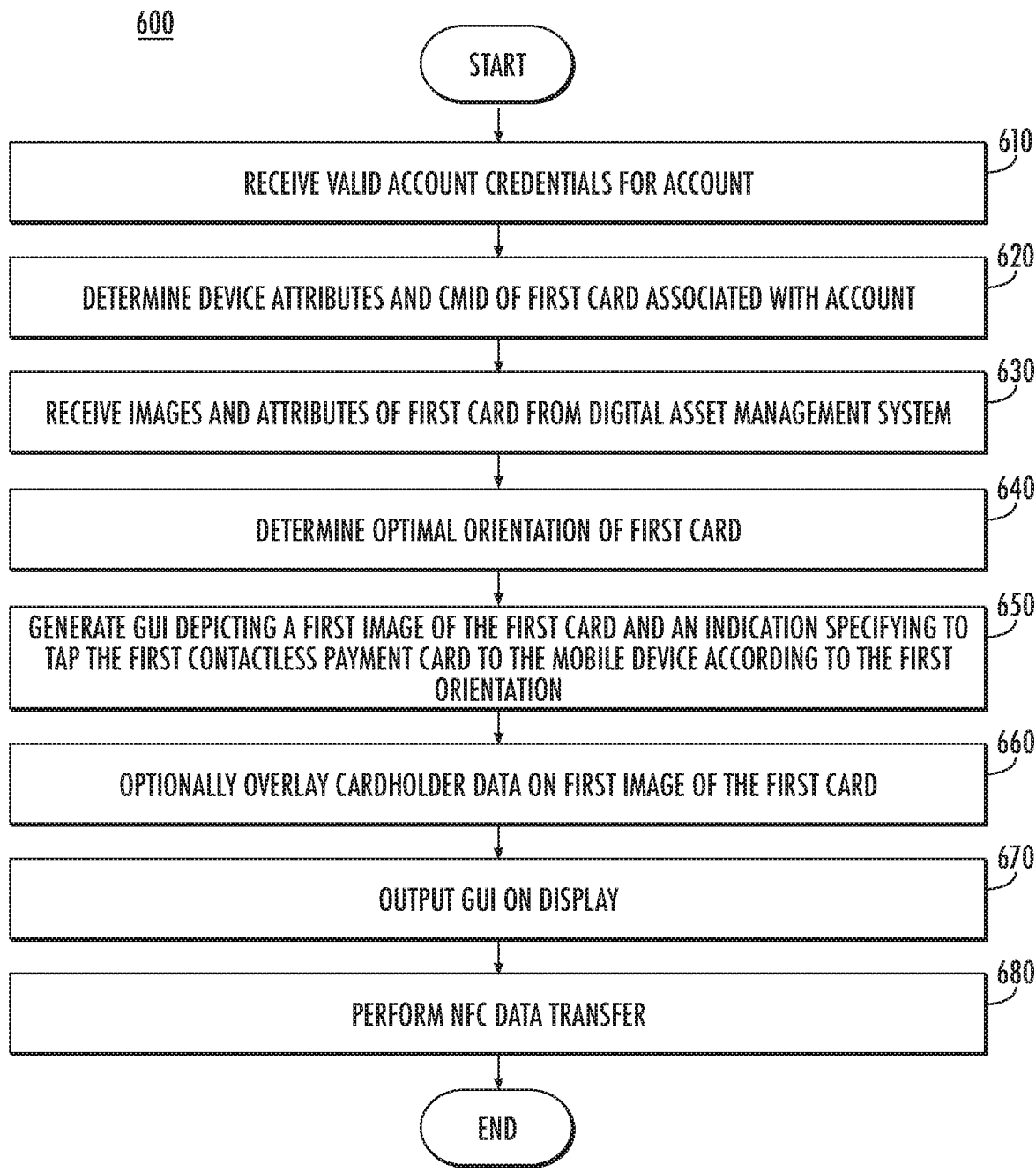
FIG. 6 illustrates an embodiment of a first logic flow.

FIG. 6 illustrates an embodiment of a logic flow 600. The logic flow 600 may be representative of some or all of the operations executed by one or more embodiments described herein. For example, the logic flow 600 may include some or all of the operations to provide accurate images of contactless cards 101 in graphical user interfaces of the account application 213 to enable data transfer (e.g., between contactless cards 101 and devices 210). Embodiments are not limited in this context.

As shown, the logic flow 600 begins at block 610, where the account application 213 receives valid authentication credentials for an account. At block 620, the account application 213 may determine the device attributes 214 of a device 210 executing the account application 213. The account application 213 may further determine a CMID of a first contactless card 101 of one or more contactless cards 101 associated with the account. In embodiments where multiple cards 101 are associated with the account, the account application 213 may select the first card 101 based on the card that is being used as part of an operation in the account application 213 (e.g., balance transfer, virtual account number generation, etc.). At block 630, the account application 213 may receive one or more images 231 of the first contactless card 101 and one or more elements of card metadata 232 from the DAM system 225 based on the CMID of the first contactless card 101.

At block 640, the account application 213 may determine an optimal orientation and/or placement of the contactless card 101 to enable data transfer with the device 210. The optimal orientation and/or placement of the contactless card 101 may be based on the card metadata 232 and/or the device attributes 214. For example, the optimal orientation may be a face-up vertical orientation placed on the screen of the device 210. As another example, the optimal orientation may be a horizontal orientation with the card 101 face-down placed on the back side (e.g., the side without a display) of the device 210.

At block 650, the account application 213 may generate a GUI depicting a first image 231 of the contactless card 101 according to the determined optimal orientation and/or location. The GUI may further include instructions to tap the contactless card 101 to the device 210 according to the optimal orientation and/or placement. At block 660, the account application 213 may optionally overlay cardholder data on the image 231 of the contactless card 101. For example, the account application 213 may overlay the cardholder name, account number of the contactless card 101, CVV of the contactless card 101, and expiration date of the contactless card 101. At block 670, the account application 213 may display the GUI on a display of the device 210. At block 680, NFC (or other wireless) data transfer may be performed between the contactless card 101 and the device 210.

Figure 7:
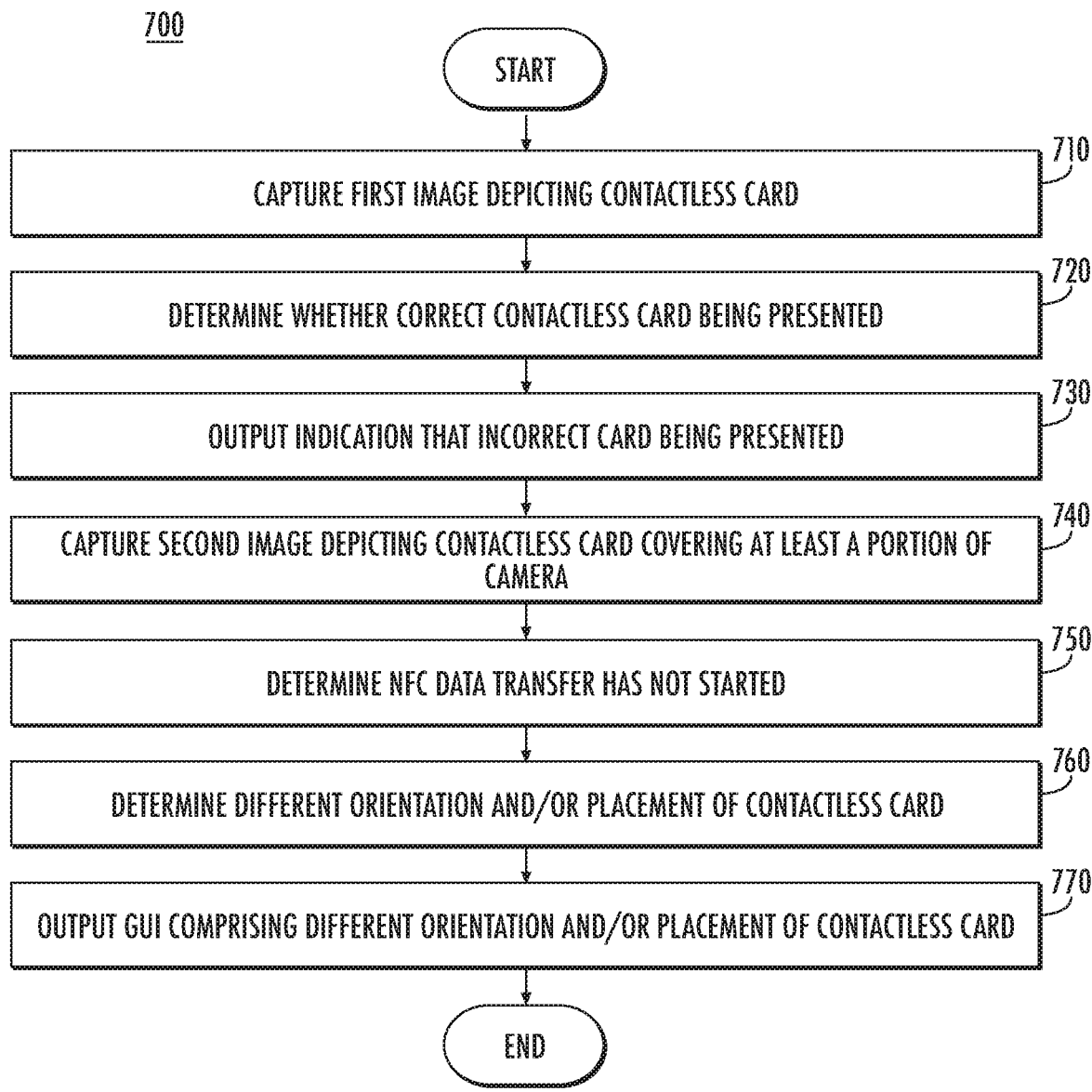
FIG. 7 illustrates an embodiment of a second logic flow.

FIG. 7 illustrates an embodiment of a logic flow 700. The logic flow 700 may be representative of some or all of the operations executed by one or more embodiments described herein. For example, the logic flow 700 may include some or all of the operations to provide accurate images of contactless cards 101 in graphical user interfaces of the account application 213. Embodiments are not limited in this context.

As shown, the logic flow 700 begins at block 710, where the camera 219 of a device 210 may capture an image depicting a contactless card 101. At block 720, the account application 213 may determine whether the correct contactless card 101 is being presented by the user. For example, if the user is attempting to generate a virtual account number for a first contactless card 101 may be required to tap the first contactless card 101 to the device 210. However, the account application 213 may analyze the image captured at block 710 to determine that a second contactless card 101, different than the first contactless card 101, is being held by the user. The account application 213 may determine that the first contactless card 101 is not being presented based on any suitable technique, such as whether the color, logos, and/or account numbers of the card depicted in the image match the corresponding color, logos, and/or account numbers of the first contactless card 101. Upon determining the user is not presenting the correct card, the account application 213 may output an indication at block 730 specifying that the incorrect contactless card 101 is being presented. The indication may be an audio indication (e.g., an error tone) and/or a visual indication (e.g., updating the GUI to inform the user that the incorrect card is detected).

At block 740, the account application 213 may instruct the camera 219 to capture a second image. The account application 213 may analyze the second image to determine that the second image depicts at least a portion of the contactless card 101 covering the camera 219. At block 750, the account application 213 may determine that data transfer between the device 210 and the contactless card 101 has not started (e.g., within a predefined time threshold). At block 760, the account application 213 may determine a different orientation and/or placement of the contactless card 101 relative to the device 210. At block 770, the account application 213 may output a GUI depicting the different orientation and/or placement of the contactless card 101 relative to the device 210.

Figure 8:
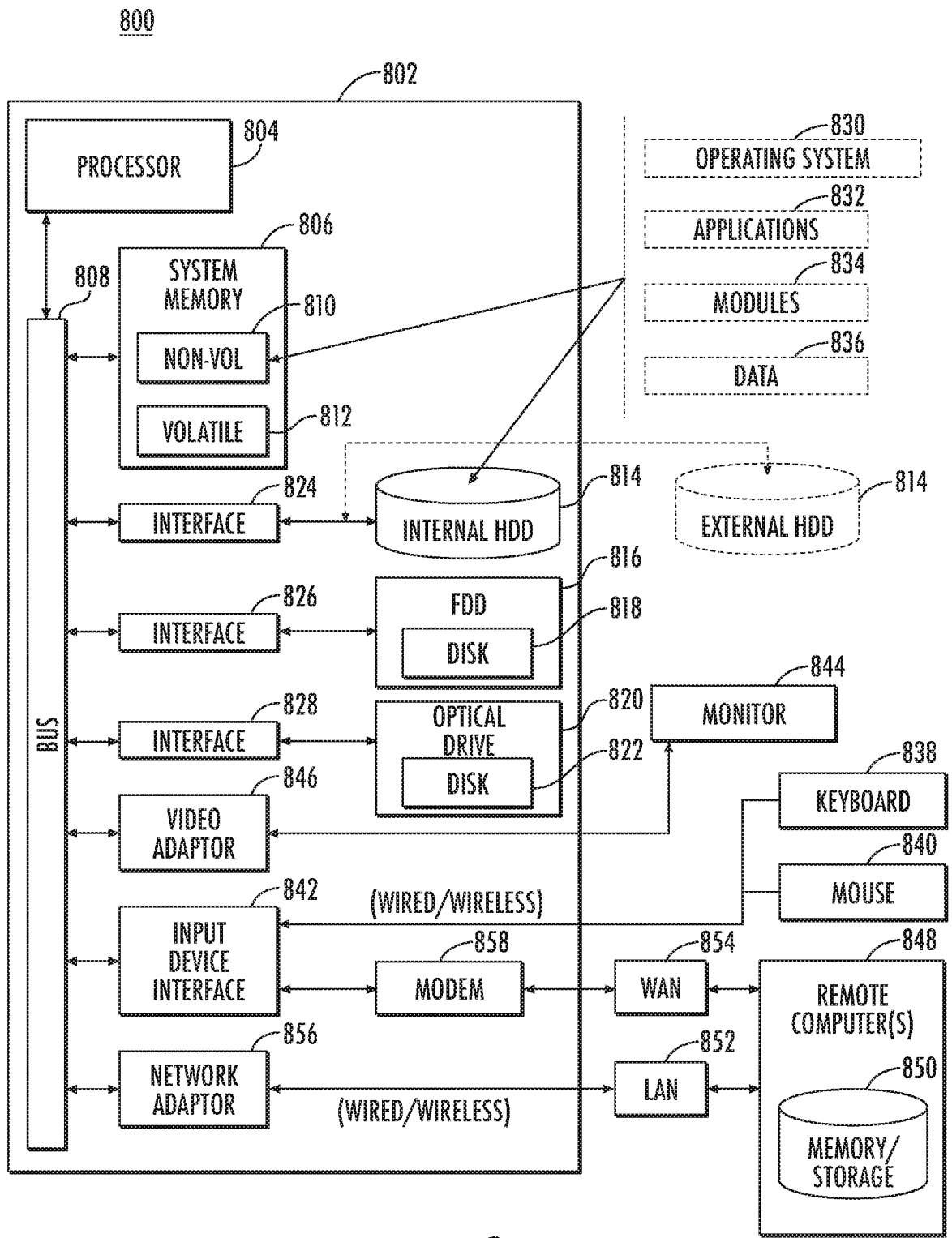
FIG. 8 illustrates an embodiment of a computing architecture.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the system 100. In some embodiments, computing system 802 may be representative, for example, of the contactless card 101, mobile devices 210, and the server 220 of the system 200. The embodiments are not limited in this context. More generally, the computing architecture 800 is configured to implement all logic, applications, systems, methods, apparatuses, and functionality described herein with reference to FIGS. 1-7.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-7.

The drives and associated computer-readable media provide volatile and/or nonvolatile storage of data, data structures, computer-readable instructions, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the systems 100 and/or 200, e.g., the applet 103, private key 104, encrypted data 105, customer ID 107, CMID 108, account application 213, the authentication application 223, account data 224, and DAM system 225.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 230 of FIG. 2 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A mobile device, comprising:
   a processor; and
   a memory storing instructions which when executed by the processor cause the processor to:
   receive, by an application executing on the processor, authentication credentials for an account;
   receive, by the application, a card manufacturer identifier (CMID);
   determine, by the application based on the CMID and in an account database for a plurality of accounts including the account, a first contactless payment card associated with the account;
   receive, by the application from a digital asset management system based on the CMID, a plurality of images of the first contactless payment card and a plurality of metadata attributes of the first contactless payment card;
   determine, by the application based on the plurality of metadata attributes of the first contactless payment card and a plurality of attributes of the mobile device, a first orientation of the first contactless payment card to enable near-field communication (NFC) data transfer between the first contactless payment card and the mobile device, wherein the first orientation aligns a communications interface of the first contactless payment card to a communications interface of the mobile device;
   select, by the application, a first image of the plurality of images depicting the first contactless payment card according to the first orientation;
   generate, by the application, a graphical user interface (GUI) depicting the first image of the plurality of images of the first contactless payment card and an indication specifying to tap the first contactless payment card to the mobile device according to the first orientation;
   display, by the application, the GUI on a display;
   determine, by the application, that NFC data transfer has not been initiated between the mobile device and the first contactless payment card within a threshold amount of time;

determine, by the application based on the plurality of metadata attributes of the first contactless payment card, a second orientation different than the first orientation; and update, by the application, the GUI to depict the first contactless payment card according to the second orientation and an indication specifying to tap the first contactless payment card to the mobile device according to the second orientation.

2. The mobile device of claim 1, wherein the first contactless payment card is of a plurality of contactless payment cards associated with the account in the account database, wherein the CMID is received from at least one of: (i) a server based on the application transmitting the authentication credentials to the server, and (ii) a wireless communications interface of the first contactless payment card, the memory storing instructions which when executed by the processor cause the processor to:

cause, by the application, a camera of the mobile device to capture an image; and determine, by the application based on an analysis of the captured image, that the captured image depicts the first contactless payment card.

3. The mobile device of claim 2, the memory storing instructions which when executed by the processor cause the processor to:

detect, by the application based on the analysis of the captured image, a graphical marker of the first contactless payment card; and determine, by the application based on the graphical marker, at least one of the plurality of metadata attributes of the first contactless payment card.

4. The mobile device of claim 1, the memory storing instructions which when executed by the processor cause the processor to:

receive, by the application, a plurality of attributes of the account, the plurality of attributes of the account comprising (i) a first name, (ii) a last name, (iii) an account number of the first contactless payment card, (iv) an expiration date of the first contactless payment card, and (v) a card verification value (CVV) of the first contactless payment card;

overlay, by the application, the plurality of attributes of the account on the first image; and display, by the application, the first image including the overlaid attributes of the account in the GUI.

5. The mobile device of claim 1, the plurality of metadata attributes of the first contactless payment card comprising: (i) a material used to manufacture the first contactless payment card, (ii) a location of an antenna of the first contactless payment card, (iii) a color of the first contactless payment card, and (iv) a first point on a surface of the first contactless payment card.

6. The mobile device of claim 5, the memory storing instructions which when executed by the processor cause the processor to:

provide, by the application, an indication of the first point on the surface of the first contactless payment card in the GUI, the first point one of a plurality of points on the surface of the first contactless payment card;

cause, by the application, a camera of the mobile device to capture an image;

determine, by the application, that a second contactless payment card depicted in the image is of a first color;

determine, by the application, that the first color is different than the color of the first contactless payment card;

determine, by the application based on the first color being different than the color of the first contactless payment card, that the second contactless payment card is not the first contactless payment card; and output, by the application, a notification in the GUI specifying to tap the first contactless payment card and not the second contactless payment card to the mobile device.

7. The mobile device of claim 6, the plurality of attributes of the mobile device comprising: (i) a location of an NFC antenna of the mobile device, and (ii) a first location of a plurality of locations on a surface of the mobile device, the first location indicating where the first contactless payment card is to be tapped to enable NFC data transfer, the memory storing instructions which when executed by the processor cause the processor to:

provide an indication of the first location on the surface of the mobile device in the GUI.

8. A non-transitory computer-readable storage medium storing computer-readable program code executable by a processor to cause the processor to:

receive, by an application executing on the processor, authentication credentials for an account;

receive, by the application, a card manufacturer identifier (CMID);

determine, by the application based on the CMID and in an account database for a plurality of accounts including the account, a first contactless payment card associated with the account;

receive, by the application from a digital asset management system based on the CMID, a plurality of images of the first contactless payment card and a plurality of metadata attributes of the first contactless payment card;

determine, by the application based on the plurality of metadata attributes of the first contactless payment card and a plurality of attributes of the mobile device, a first orientation of the first contactless payment card to enable near-field communication (NFC) data transfer between the first contactless payment card and a mobile device comprising the processor, wherein the first orientation aligns a communications interface of the first contactless payment card to a communications interface of the mobile device;

select, by the application, a first image of the plurality of images depicting the first contactless payment card according to the first orientation;

generate, by the application, a graphical user interface (GUI) depicting the first image of the plurality of images of the first contactless payment card and an indication specifying to tap the first contactless payment card to the mobile device according to the first orientation;

display, by the application, the GUI on a display;

determine, by the application, that NFC data transfer has not been initiated between the mobile device and the first contactless payment card within a threshold amount of time;

determine, by the application based on the plurality of metadata attributes of the first contactless payment card, a second orientation different than the first orientation; and update, by the application, the GUI to depict the first contactless payment card according to the second orientation and an indication specifying to tap the first contactless payment card to the mobile device according to the second orientation.

9. The non-transitory computer-readable storage medium of claim 8, wherein the first contactless payment card is of a plurality of contactless payment cards associated with the account in the account database, wherein the CMID is received from at least one of: (i) a server based on the application transmitting the authentication credentials to the server, and (ii) a wireless communications interface of the first contactless payment card, the medium storing computer-readable program code executable by the processor to cause the processor to:
cause, by the application, a camera of the mobile device to capture an image; and
determine, by the application based on an analysis of the captured image, that the captured image depicts the first contactless payment card within a predefined distance of the camera.

10. The non-transitory computer-readable storage medium of claim 8, storing computer-readable program code executable by the processor to cause the processor to:
receive, by the application prior to determining the first contactless payment card, a request specifying to perform an operation based on the first contactless payment card.

11. The non-transitory computer-readable storage medium of claim 10, storing computer-readable program code executable by the processor to cause the processor to:
receive, by the application, a plurality of attributes of the account, the plurality of attributes of the account comprising (i) a first name, (ii) a last name, (iii) an account number of the first contactless payment card, (iv) an expiration date of the first contactless payment card, and (v) a card verification value (CVV) of the first contactless payment card;
overlay, by the application, the plurality of attributes of the account on the first image; and
display, by the application, the first image including the overlaid attributes of the account in the GUI.

12. The non-transitory computer-readable storage medium of claim 8, the plurality of metadata attributes of the first contactless payment card comprising: (i) a material used to manufacture the first contactless payment card, (ii) a location of an antenna of the first contactless payment card, (iii) a color of the first contactless payment card, and (iv) a first point on a surface of the first contactless payment card.

13. The non-transitory computer-readable storage medium of claim 12, storing computer-readable program code executable by the processor to cause the processor to:
provide, by the application, an indication of the first point on the surface of the first contactless payment card in the GUI, the first point one of a plurality of points on the surface of the first contactless payment card;
cause, by the application, a camera of the mobile device to capture an image;
determine, by the application, that a second contactless payment card depicted in the image is of a first color;
determine, by the application, that the first color is different than the color of the first contactless payment card;
determine, by the application based on the first color being different than the color of the first contactless payment card, that the second contactless payment card is not the first contactless payment card; and
output, by the application, a notification in the GUI specifying to tap the first contactless payment card and not the second contactless payment card to the mobile device.

14. The non-transitory computer-readable storage medium of claim 13, the plurality of attributes of the mobile device comprising: (i) a location of an NFC antenna of the mobile device, and (ii) a location of the mobile device where the first contactless payment card is to be tapped to enable NFC data transfer.

15. A method, comprising:
receiving, by an application executing on a processor of a mobile device, authentication credentials for an account;
receiving, by the application, a card manufacturer identifier (CMID);
determining, by the application based on the CMID and in an account database for a plurality of accounts including the account, a first contactless payment card associated with the account;
receiving, by the application from a digital asset management system based on the CMID, a plurality of images of the first contactless payment card and a plurality of metadata attributes of the first contactless payment card;
determining, by the application based on the plurality of metadata attributes of the first contactless payment card and a plurality of attributes of the mobile device, a first orientation of the first contactless payment card to enable near-field communication (NFC) data transfer between the first contactless payment card and the mobile device, wherein the first orientation aligns a communications interface of the first contactless payment card to a communications interface of the mobile device;
selecting, by the application, a first image of the plurality of images depicting the first contactless payment card according to the first orientation;
generating, by the application, a graphical user interface (GUI) depicting the first image of the plurality of images of the first contactless payment card and an indication specifying to tap the first contactless payment card to the mobile device according to the first orientation;
displaying, by the application, the GUI on a display;
determining, by the application, that NFC data transfer has not been initiated between the mobile device and the first contactless payment card within a threshold amount of time;
determining, by the application based on the plurality of metadata attributes of the first contactless payment card, a second orientation different than the first orientation; and
updating, by the application, the GUI to depict the first contactless payment card according to the second orientation and an indication specifying to tap the first contactless payment card to the mobile device according to the second orientation.

16. The method of claim 15, wherein the first contactless payment card is of a plurality of contactless payment cards associated with the account in the account database, wherein the CMID is received from at least one of: (i) a server based on the application transmitting the authentication credentials to the server, and (ii) a wireless communications interface of the first contactless payment card, the method further comprising:
causing, by the application, a camera of the mobile device to capture an image; and
determining, by the application based on an analysis of the captured image, that the captured image depicts the first contactless payment card.

17. The method of claim 15, further comprising:

receiving, by the application, a plurality of attributes of the account, the plurality of attributes of the account comprising (i) a first name, (ii) a last name, (iii) an account number of the first contactless payment card, (iv) an expiration date of the first contactless payment card, and (v) a card verification value (CVV) of the first contactless payment card;

overlaying, by the application, the plurality of attributes of the account on the first image; and displaying, by the application, the first image including the overlaid attributes of the account in the GUI.

18. The method of claim 17, the plurality of metadata attributes of the first contactless payment card comprising: (i) a material used to manufacture the first contactless payment card, (ii) a location of an antenna of the first contactless payment card, (iii) a color of the first contactless payment card, and (iv) a first point on a surface of the first contactless payment card.

19. The method of claim 18, further comprising:

providing, by the application, an indication of the first point on the surface of the first contactless payment card in the GUI, the first point one of a plurality of points on the surface of the first contactless payment card;

causing, by the application, a camera of the mobile device to capture an image;

determining, by the application, that a second contactless payment card depicted in the image is of a first color;

determining, by the application, that the first color is different than the color of the first contactless payment card;

determining, by the application based on the first color being different than the color of the first contactless payment card, that the second contactless payment card is not the first contactless payment card; and outputting, by the application, a notification in the GUI specifying to tap the first contactless payment card and not the second contactless payment card to the mobile device.

20. The method of claim 19, the plurality of attributes of the mobile device comprising: (i) a location of an NFC antenna of the mobile device, and (ii) a location of the mobile device where the first contactless payment card is to be tapped to enable NFC data transfer.

* * * * *